US011303992B2

(12) United States Patent
McCollum Bechert et al.

(10) Patent No.: US 11,303,992 B2
(45) Date of Patent: Apr. 12, 2022

(54) WEARABLE DEVICE AND SYSTEM FOR PERSONAL AUDIO MESSAGING

(71) Applicant: MACHO DAISY, LLC, Clifton, VA (US)

(72) Inventors: Michelle McCollum Bechert, Clifton, VA (US); Fred Bechert, Clifton, VA (US)

(73) Assignee: MACHO DAISY, LLC., Clifton, VA (US)

(*) Notice: Subject to any disclaimer, the term of this patent is extended or adjusted under 35 U.S.C. 154(b) by 0 days.

(21) Appl. No.: 16/315,636

(22) PCT Filed: Jul. 6, 2017

(86) PCT No.: PCT/US2017/040782
§ 371 (c)(1),
(2) Date: Jan. 6, 2019

(87) PCT Pub. No.: WO2018/009588
PCT Pub. Date: Jan. 11, 2018

(65) Prior Publication Data
US 2019/0306611 A1    Oct. 3, 2019

Related U.S. Application Data

(60) Provisional application No. 62/358,971, filed on Jul. 6, 2016.

(51) Int. Cl.
*H04R 1/10* (2006.01)
*G09B 19/00* (2006.01)
(Continued)

(52) U.S. Cl.
CPC ............. *H04R 1/1091* (2013.01); *A44C 7/00* (2013.01); *A44C 15/0015* (2013.01);
(Continued)

(58) Field of Classification Search
CPC .... H04R 1/1091; H04R 2420/07; A44C 7/00; A44C 15/0015; G06F 1/163; G09B 5/04;
(Continued)

(56) References Cited

U.S. PATENT DOCUMENTS

| 4,444,515 A | 4/1984 | Clark |
| 4,821,247 A | 4/1989 | Grooms |

(Continued)

FOREIGN PATENT DOCUMENTS

| CA | 2781814 | 12/2013 |
| CN | 101181108 | 5/2008 |

(Continued)

OTHER PUBLICATIONS http://www.bluetopazwireless.com/ (1 page).
(Continued)

*Primary Examiner* — Vivian C Chin
*Assistant Examiner* — Douglas J Suthers
(74) *Attorney, Agent, or Firm* — Graeser Associates International Inc; Dvorak Graeser

(57) ABSTRACT

A unique system for providing wireless messaging to a user within an earring type device is described. The earring type device (any type of ear jewelry—pierced, clip-on, cuff, etc.) includes an embedded wireless Audio Clip Player, a Bluetooth transceiver, a speaker, battery with wired or wireless charging, memory to hold configuration or audio files, and switches (mechanical, capacitive touch, etc.) for control. The utility of these electronics embedded in the earring is so to periodically (predetermined timing) play short audio clip messages to the user's ear with the ambient noise, as if someone were whispering in their ear. The system includes a smartphone application that manages timing and transmits (Continued)

audio clips for personal messaging as well as creates a platform for social media and repository of audio clips from a community of users.

22 Claims, 28 Drawing Sheets

(51) Int. Cl.

| | |
|---|---|
| H04M 1/725 | (2021.01) |
| A44C 7/00 | (2006.01) |
| G09B 5/04 | (2006.01) |
| A44C 15/00 | (2006.01) |
| G06F 1/16 | (2006.01) |
| H04M 1/60 | (2006.01) |
| H04M 1/72412 | (2021.01) |
| H04M 1/72433 | (2021.01) |
| H04M 1/05 | (2006.01) |
| H04M 1/72451 | (2021.01) |

(52) U.S. Cl.
CPC .............. *G06F 1/163* (2013.01); *G09B 5/04* (2013.01); *G09B 19/00* (2013.01); *H04M 1/6066* (2013.01); *H04M 1/72412* (2021.01); *H04M 1/72433* (2021.01); H04M 1/05 (2013.01); H04M 1/72451 (2021.01); H04M 2250/02 (2013.01); H04R 2420/07 (2013.01)

(58) Field of Classification Search
CPC .. G09B 19/00; H04M 1/6066; H04M 1/7253; H04M 1/7255; H04M 1/05; H04M 1/72566; H04M 2250/02
USPC .......................................................... 381/74
See application file for complete search history.

(56) References Cited

U.S. PATENT DOCUMENTS

| | | | |
|---|---|---|---|
| 5,140,840 A | 8/1992 | Miceli | |
| D372,312 S | 7/1996 | Lange | |
| 7,013,018 B2 | 3/2006 | Bogeskov-Jensen | |
| 7,206,429 B1* | 4/2007 | Vossler | H04R 1/1033 |
| | | | 381/381 |
| 7,536,150 B2 | 5/2009 | Ryann | |
| 7,715,888 B2 | 5/2010 | Ko | |
| 8,086,288 B2 | 12/2011 | Klein | |
| 8,861,771 B2 | 10/2014 | Stott | |
| 9,084,054 B2 | 7/2015 | Prelogar | |
| 9,392,851 B2 | 7/2016 | Lam | |
| 2004/0066948 A1 | 4/2004 | Bogeskov-Jensen | |
| 2006/0278064 A1* | 12/2006 | Lourdeaux | H04L 67/22 |
| | | | 84/609 |
| 2007/0058831 A1 | 3/2007 | Rie | |
| 2007/0154047 A1 | 7/2007 | Coyne | |
| 2008/0031475 A1* | 2/2008 | Goldstein | H04W 4/80 |
| | | | 381/151 |
| 2008/0049961 A1 | 2/2008 | Brindisi | |
| 2008/0159548 A1 | 7/2008 | Solum | |
| 2008/0161023 A1 | 7/2008 | Ko | |
| 2009/0202096 A1 | 8/2009 | Ryann | |
| 2011/0216931 A1 | 9/2011 | Bui | |
| 2012/0308069 A1 | 12/2012 | Stott | |
| 2013/0287241 A1 | 10/2013 | Prelogar | |
| 2013/0343562 A1 | 12/2013 | Amsalem | |
| 2014/0098983 A1 | 4/2014 | Clow | |
| 2014/0116085 A1 | 5/2014 | Lam | |
| 2014/0192996 A1 | 7/2014 | Wilcox | |
| 2014/0219467 A1 | 8/2014 | Kurtz | |
| 2014/0220893 A1 | 8/2014 | Zhou | |
| 2014/0270227 A1* | 9/2014 | Swanson | G06F 16/60 |
| | | | 381/74 |
| 2014/0323183 A1 | 10/2014 | Klein | |
| 2014/0338397 A1 | 11/2014 | Andreini, III | |
| 2015/0071457 A1 | 3/2015 | Burciu | |
| 2016/0196487 A1 | 7/2016 | Huynh | |

FOREIGN PATENT DOCUMENTS

| | | |
|---|---|---|
| CN | 201111925 | 9/2008 |
| CN | 201142755 | 10/2008 |
| CN | 101773320 | 7/2010 |
| CN | 201523441 | 7/2010 |
| CN | 202222571 | 5/2012 |
| CN | 102496382 | 6/2012 |
| CN | 202282843 | 6/2012 |
| CN | 203776268 | 8/2014 |
| CN | 104754432 | 7/2015 |
| CN | 104839951 | 8/2015 |
| CN | 204635295 | 9/2015 |
| CN | 204741538 | 11/2015 |
| CN | 205249451 | 5/2016 |
| DE | 102007046632 | 4/2009 |
| EP | 1929753 | 6/2008 |
| EP | 2160887 | 3/2010 |
| KR | 20080005249 | 1/2008 |
| KR | 20110067849 | 6/2011 |
| KR | 20120100088 | 9/2012 |
| WO | 2005053352 | 6/2005 |
| WO | 2007027467 | 3/2007 |
| WO | 2008156693 | 12/2008 |
| WO | 2011025163 | 3/2011 |
| WO | 2014143160 | 9/2014 |

OTHER PUBLICATIONS https://earin.com/ (15 pages).
https://join.shinetext.com/ (8 pages).
https://ringly.com/ (6 pages).
https://www.bellabeat.com/ (3 pages).
https://www.theverge.com/2016/1/7/10730300/bragi-dash-real-wireless-earbuds-ces-2016 (6 pages).
https://www.wonderbible.com/.

* cited by examiner

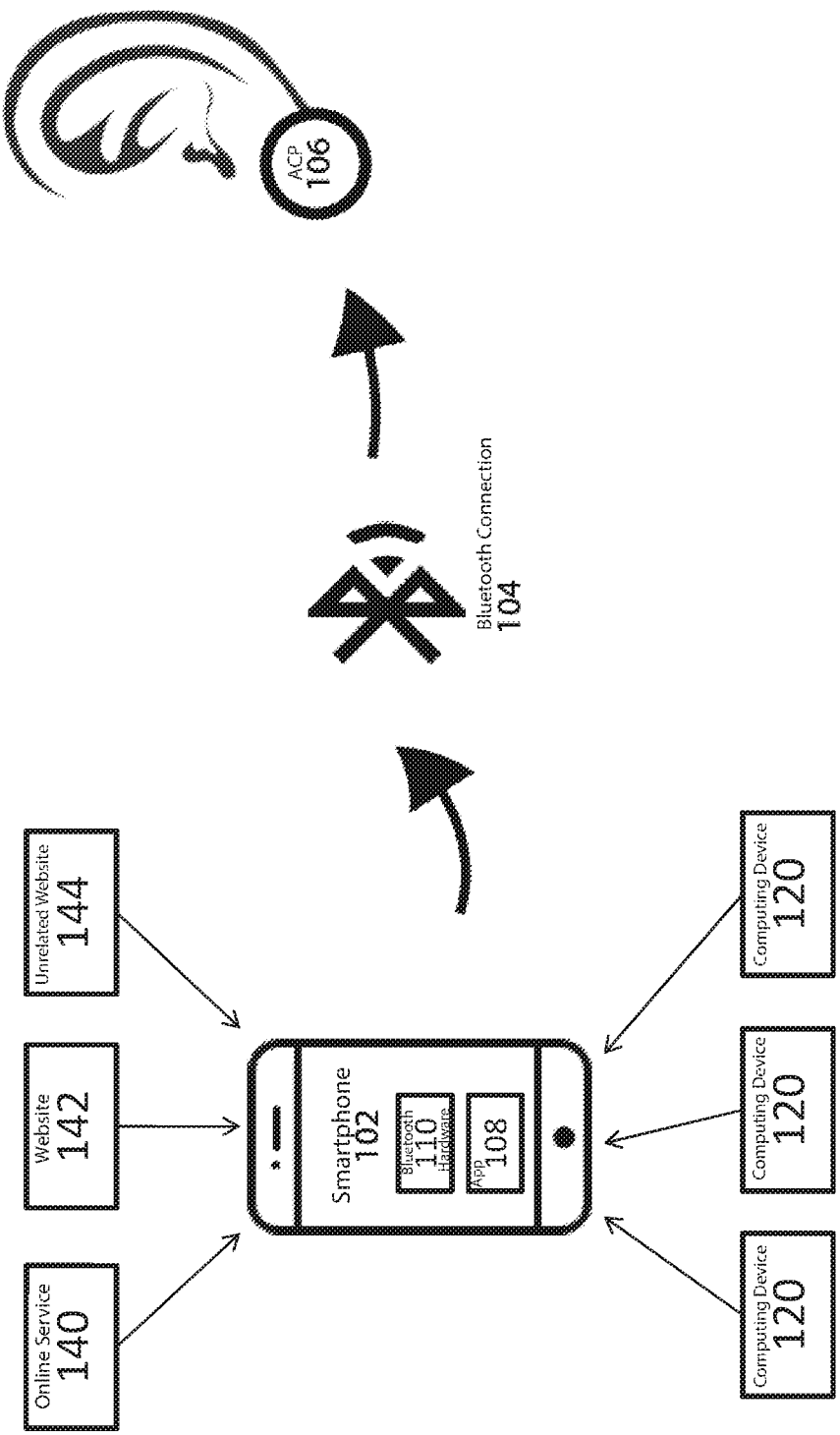

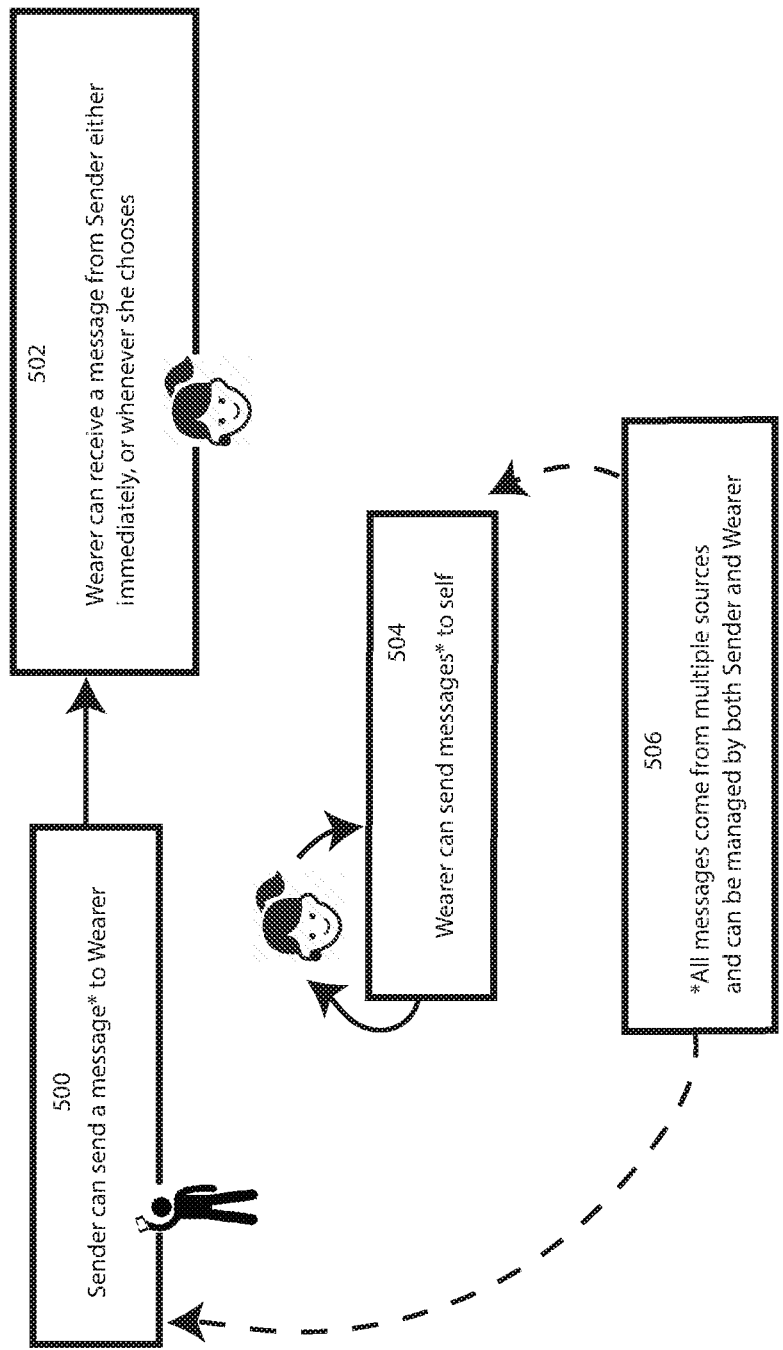

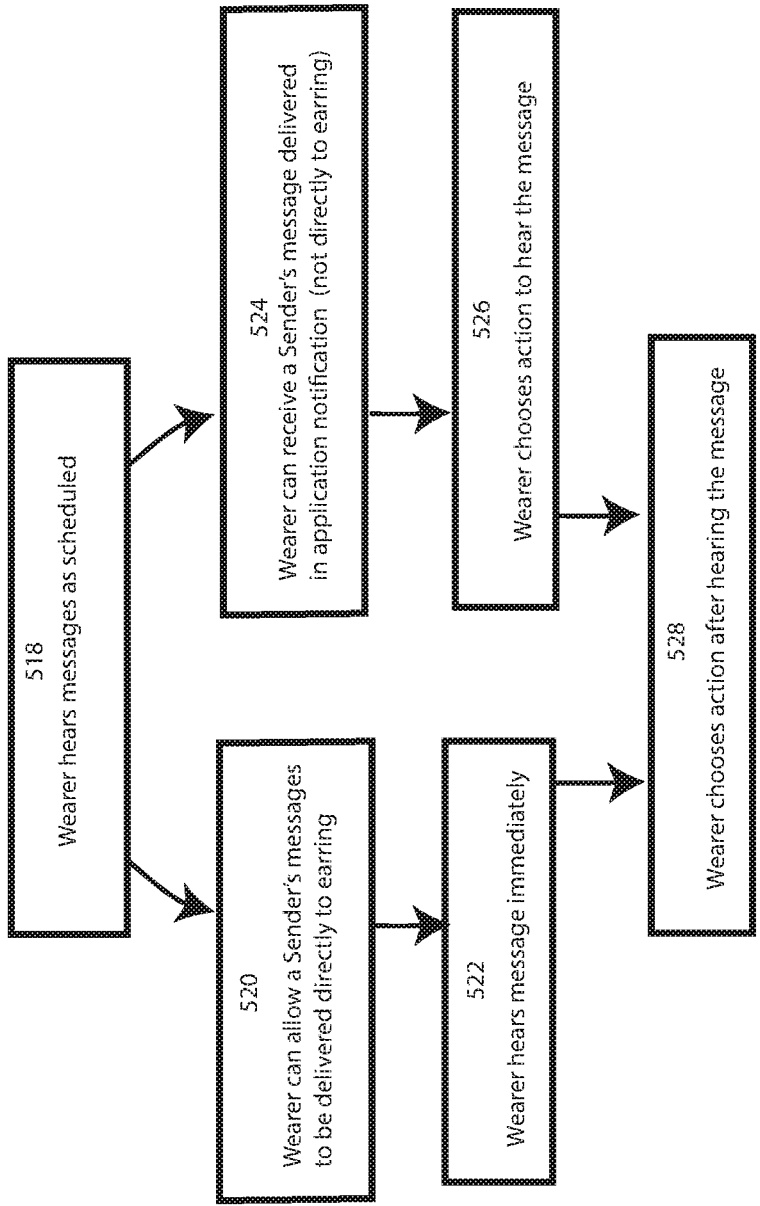

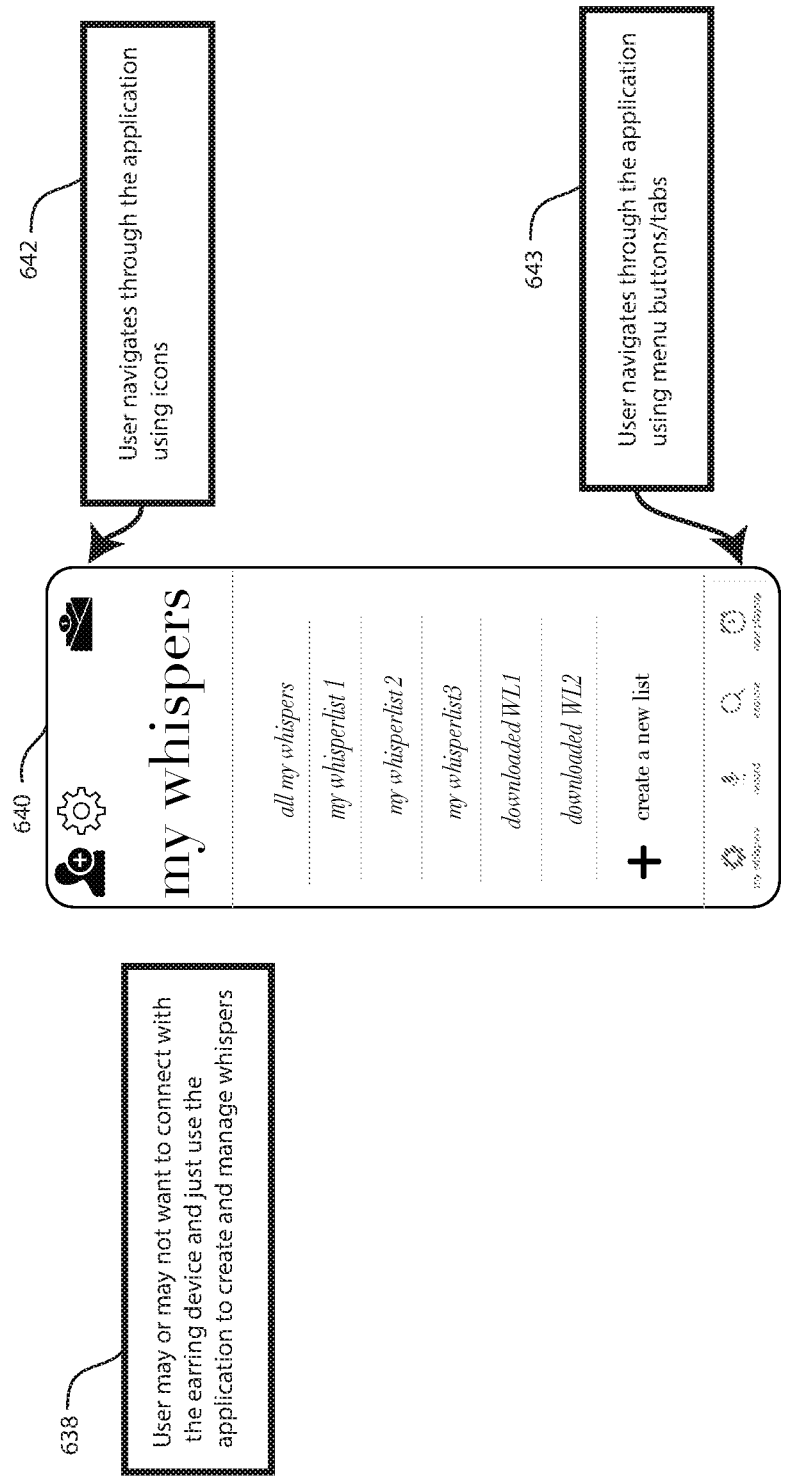

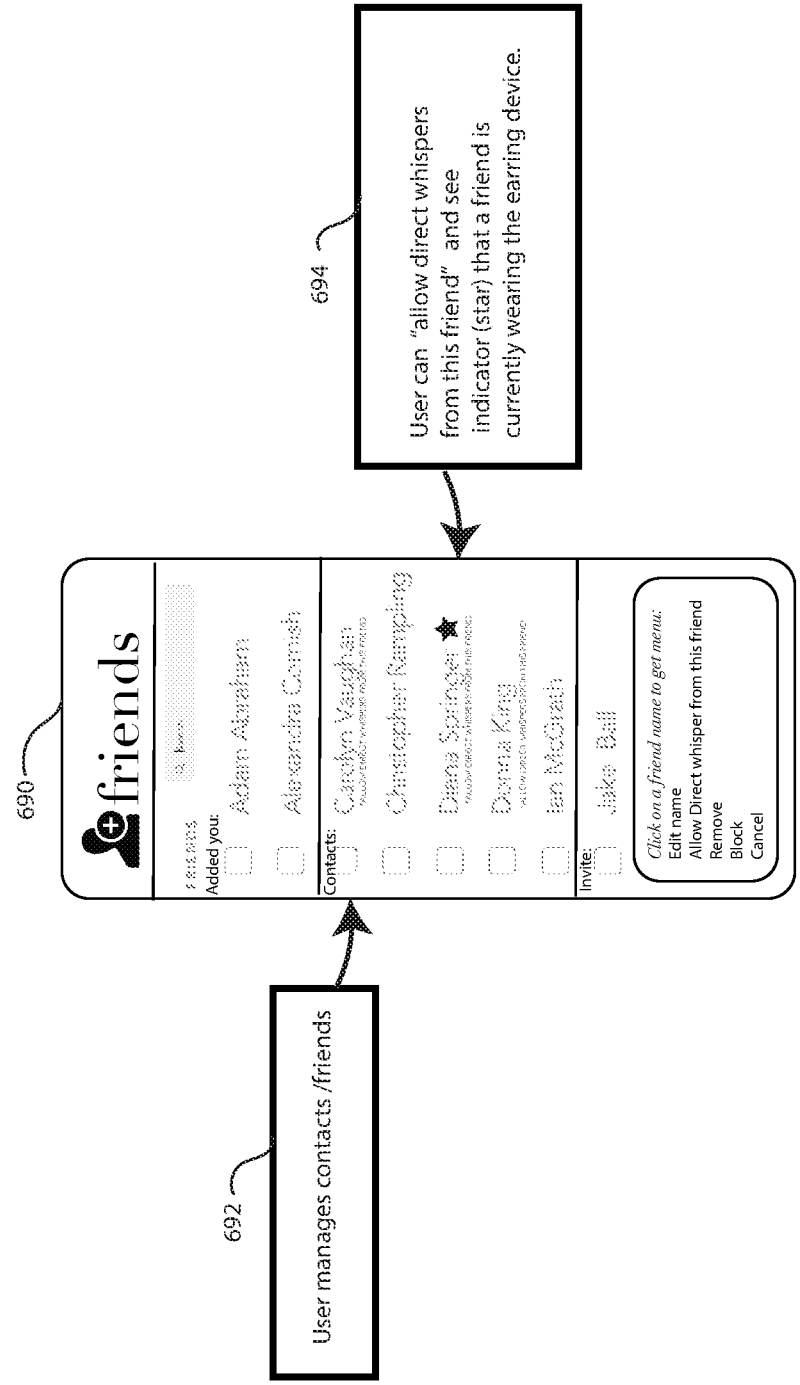

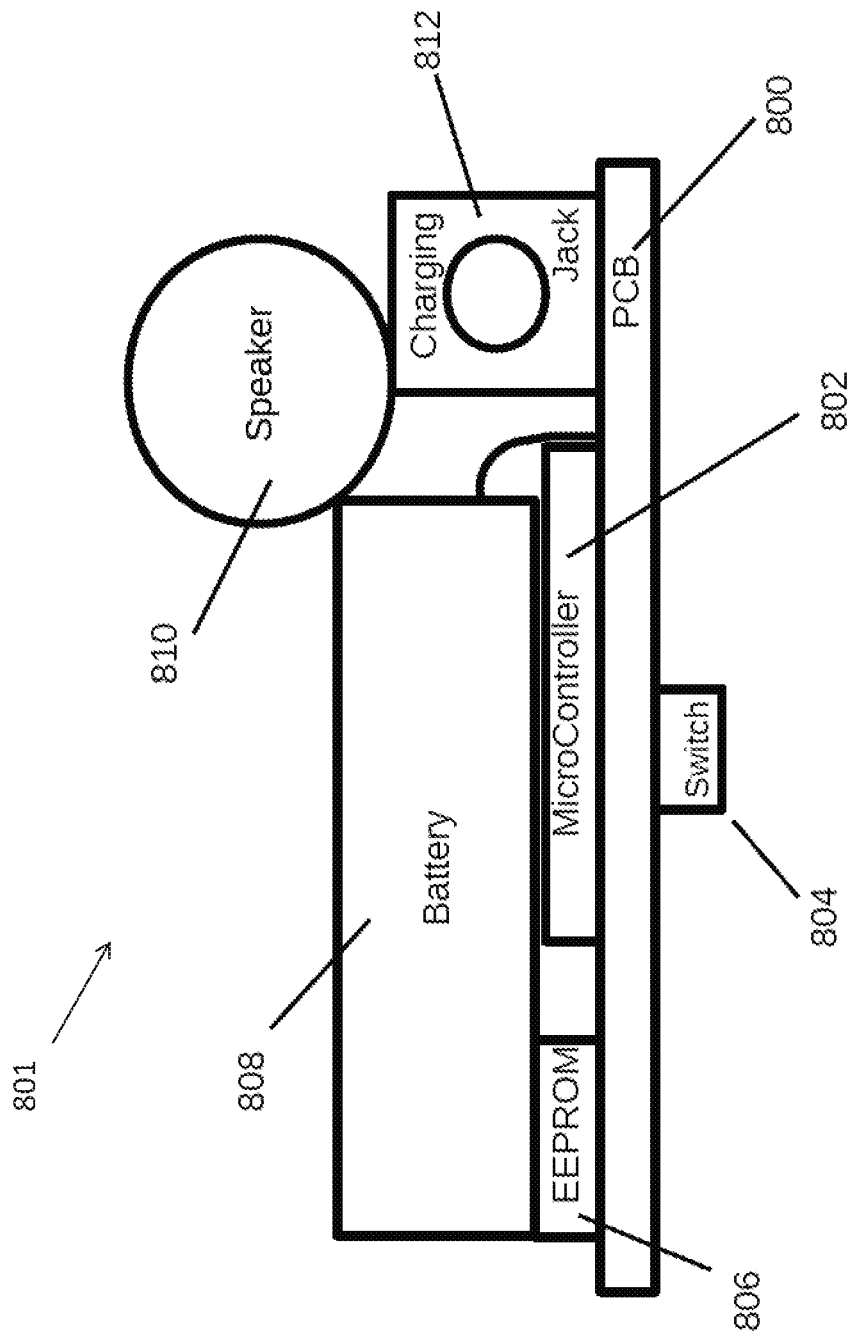

WEARABLE DEVICE AND SYSTEM FOR PERSONAL AUDIO MESSAGING

FIELD OF THE INVENTION

The present invention, in at least some embodiments, relates to a system and method for a wearable device for personal audio messaging, and in particular to such a wearable device that receives audio files from an external source and plays them to the wearer.

BACKGROUND OF THE INVENTION

It is known in the art to wear earbuds for receiving streaming audio data. The earbud is worn in the user's ear and is connected to a device that actually produces the audio data, whether through a wire or wireless communication.

US 2016/0196487 relates to an earring which is capable of passive near field communication, for example through RFID.

BRIEF SUMMARY OF THE INVENTION

The background art does not teach or suggest a system, device or method for personal messaging to an audio device that is worn by the user. The background art also does not teach or suggest such a system, device or method for providing an audio device in the form of an earring to be worn by the user.

The present invention, in at least some embodiments, overcomes these drawbacks of the background art by providing a system, device and method for personal messaging that is wearable by the user and that preferably communicates through wireless communication, yet which differs from the background art for a number of reasons, a non-limiting list of which is given below.

Earbuds or even earring type devices in the prior art have been used for focused listening—music, podcast, or even noise canceling. The audio may be transferred wirelessly via Bluetooth, or through a wire (or other), or the audio is stored locally in the device, either way, the audio listening amount of time is controlled by the user at the time of listening; the user selects when to start and stop. This device is used for a different purpose. It is designed for recorded messaging, not audio streaming. It is the same, in that, the audio files are either stored or transferred wirelessly, but different in the purpose and implementation of playing the audio and the size of the audio clip. This device is used for messaging via a suitable communication channel such as Bluetooth from a computer/mobile phone. In this case, the user pre-selects the timing of the audio to be played (timed, random, or immediate). The earrings are worn with the purpose of the user being interrupted with a short audio clip to be played as a message. The user is most likely not aware when the audio will be played, therefore does not control the starting and stopping of the audio. The audio message is very short, to prompt the user's thinking as opposed to a song or podcast. Also this device is smaller and lighter, optionally using RF or inductive charging to obviate the need of a USB port or wires. It optionally has capacitive touch for controls, one way messaging without microphones, and also can be used as stand alone jewelry. It comprises a mobile phone application and an earring device as part of an overall messaging system.

The earring of US 2016/0196487 does not feature any type of active wireless communication, nor does it feature a speaker or other component for displaying audio data.

According to at least some embodiments, there is provided a wearable device for displaying audible data, comprising an audible display for displaying audio data, a memory for storing said audio data, a wireless communicator for receiving said audio data, and a mount for being wearably mounted such that said displayed audio data is audible to the wearer, wherein said audible display, said memory and said wireless communicator are attached to or formed with said mount.

Optionally said mount is adapted for being worn on a head. Optionally said mount is adapted for being worn on an exterior of an ear. Optionally said mount is adapted for being worn as an earring. Optionally said wireless communicator comprises a passive communication channel. Optionally said passive communication channel comprises RFID. Optionally said wireless communicator comprises an active communication channel, and a power source for powering said wireless communicator and said speaker. Optionally said wireless communicator comprises a receiver comprising a communication channel selected from the group consisting of Bluetooth, infrared and cellular. Optionally said audio data is only displayable if stored in said memory. Optionally the device further comprises a housing for housing said speaker and said wireless communicator, wherein said housing is physically attached to or integrably formed with said mount. Optionally the device further comprises a light emitter mounted on said housing for emitting light. Optionally said light emitter comprises an LED (light emitting diode). Optionally said wireless communicator comprises only a receiver and does not comprise an audio transmitter. Optionally the device further comprises a microcontroller for controlling audible display of said audio data according to one or more commands stored in said memory.

According to at least some embodiments, there is provided a system comprising the device as described above or herein, and further comprising a computational device, said computational device comprising a wireless communicator for communicating with said wireless communicator of the device, and a software for managing said audio data for being communicated to the device for being stored on said memory of the device.

Optionally said software comprises a user interface for receiving audio data and wherein said software manages transmission of said audio data to the device. Optionally said user interface receives a timing command for timing of audible display of said audio data by said speaker and said software sends at least one command to control timing to the device and/or sends said audio data to the device according to said timing command. Optionally said computational device is selected from the group consisting of a tablet, a smartphone, a mobile device, a stand-alone computer and a smart watch. Optionally said computational device is in communication with at least one other computational device for receiving audio data from said at least one other computational device, and for transmitting said received audio data to said wearable device. Optionally said software of said computational device determines whether to accept said received audio data before said received audio data is transmitted to said wearable device.

According to at least some embodiments, there is provided a method for displaying audible data to a user, wherein the user wears the wearable device of the system as described above or herein, comprising: determining audio data to transmit to the wearable device through said software of said computational device; transmitting said audio data to the wearable device from said computational device; and displaying the audible data through said speaker of the wearable device.

Optionally the method further comprises determining a timing of displaying said audio data through said software of said computational device; transmitting a timing command and/or the audible data according to said timing command to the wearable device from said computational device to determining said timing; and displaying the audible data through said speaker of the wearable device according to said timing. Optionally said timing is selected from the group consisting of random, played at a specific time, played at a delayed time, repeated or played only once. Optionally said delayed time is at least 5 seconds. Optionally said delayed time is no more than 60 seconds.

Timing of playback may optionally be controlled by transmitting the audio data to the wearable device in advance, and then sending a command to execute from the computational device at the time to display the audio data; transmitting the audio data to the wearable device in advance, with the command to execute from the computational device at the time to display the audio data; or transmitting the audio data to the wearable device at the time of display.

Optionally the method further comprises determining whether to accept incoming audio data from another computational device; and if accepted, transmitting said incoming audio data to the wearable device. Optionally said determining whether to accept incoming audio data comprises determining a list of at least one computational device permitted to have access; comparing said other computational device to said list; and accepting said incoming audio data only if said other computational device is on said list. Optionally the method further comprises providing a social media platform for supporting engagement between a plurality of users, wherein said platform comprises said list, wherein a first user connects with a second user through said platform, such that upon said connection, a computational device of said first user is placed on said list of said second user and vice versa. Optionally the method further comprises a coaching process for coaching said user to engage in a behavioral change, said coaching process comprising determining a plurality of audio data clips to be audibly displayed by the wearable device according to a predetermined timing; transmitting said plurality of audio data clips to the wearable device; and playing back each of said plurality of audio data clips according to said predetermined timing. Optionally the method further comprises receiving feedback from the user regarding said coaching process, such that said software of said computational device adjusts one or more messages according to said feedback.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Although the present invention is described with regard to a "computing device", a "computer", or "mobile device", it should be noted that optionally any device featuring a data processor and the ability to execute one or more instructions may be described as a computer, including but not limited to any type of personal computer (PC), a server, a distributed server, a virtual server, a cloud computing platform, a cellular telephone, an IP telephone, a smartphone, or a PDA (personal digital assistant). Any two or more of such devices in communication with each other may optionally comprise a "network" or a "computer network".

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings:

FIGS. 1A-1B are schematic drawings showing the interaction between a smartphone application, an Audio Clip Player (ACP), and other entities according to at least some embodiments of the present invention;

FIGS. 5A-5D show an exemplary flow for sending a whispered message electronically according to at least some embodiments of the present invention;

FIGS. 6A-6K show a plurality of different methods for communication and for control between a mobile device and the earring device according to at least some embodiments of the present invention;

FIG. 8 shows a further non-limiting implementation of a device for providing whispers according to at least some embodiments of the present invention

DETAILED DESCRIPTION OF EMBODIMENTS OF THE INVENTION

Figure 1B:
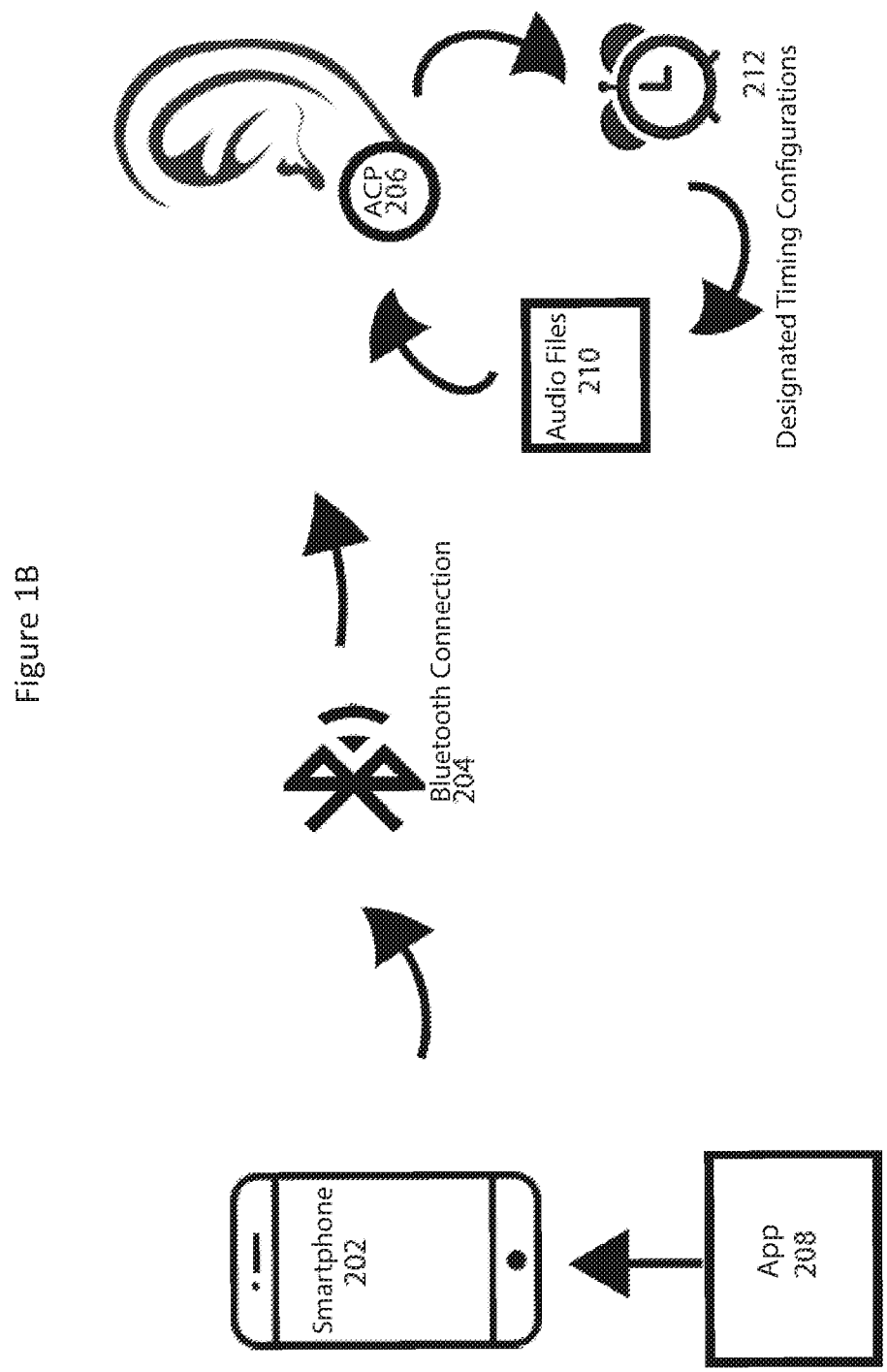

The present invention in at least some embodiments is a wireless electronic device that is embedded in an earring to allow the earring to become an audible messaging system. The device, which is referred to herein as an Audio Clip Player (ACP), plays short audio files through a speaker for the user to hear, and may optionally be integrated into an earring. Although the terms "ACP" and "earring" are used interchangeably, it is understood that the device for playing the audio files does not need to be in the form of an earring. Preferably, the ACP is in the form of a wearable device.

The audio files are messages to the user, chosen in order to aid the user in prompting memory, improving self-esteem, or enhancing the user thought process throughout the day. Messages are preferably set to play at random times, or alternatively at specific times, or alternatively immediately upon wireless transfer onto the device. Further, the device is preferably a means for hearing audio messages provided from a connected communication device such as a mobile phone or other communication device.

The ACP may optionally play short (1-15 second) audio clips at a low duty cycle: e.g., perhaps two audio clips every 5 minutes. Audio clip files and other configuration data are sent to the ACP via a suitable communication method, such as for example a Bluetooth interface, from an integrated application in smart phone or computer. The communication method may optionally involve any type of suitable wireless or wired communication to the smart phone or computer. The audio files in the ACP system may be updated by the user at any time. Optionally wireless charging may be used such that there are no connectors or cables required in normal use.

Reference is now made to FIG. 1A which is a schematic drawing showing the interaction between a smartphone application, an ACP (for example implemented as an earring), and other entities according to at least some embodiments of the present invention. As shown in FIG. 1A, an app 108 runs on a smartphone or mobile phone 102 which is a computing device as described herein. Optionally any type of computing device may be used as described herein. App 108 is designed to allow a user to interact with and program the ACP 106 as further described below. App 108 is preferably upgradeable as known in the art to add features and functionality.

Smartphone 102 comprises Bluetooth hardware 110 such as an antenna and electronic circuitry and provides means for apps running on smartphone 102 to access the Bluetooth hardware. Bluetooth is used as a non-limiting example of a wireless communication method and the hardware required therefore is a non-limiting example of a wireless communicator (which preferably only features a receiver, not a transmitter); other non-limiting methods include cellular communication, RFID (radio frequency identification), infrared signals and the like. Optionally, the wireless communication method is passive, as for example with RFID, in which ACP 106 may optionally not power the wireless communication method. Alternatively, the wireless communication method is active. The distance for such communication may vary, optionally within a distance of about 1 cm to 10 meters, 1 cm to 1 meter, less than a meter or 4-10 cm or less. Optionally, instead of wireless communication, a communication wire may optionally connect between smartphone 102 and ACP 106.

As shown in the drawing, app 108 makes use of Bluetooth hardware 110 to create a wireless Bluetooth connection 104 with ACP 106, optionally version 4.0 or higher. App 108 uses the Bluetooth connection 104 for transferring audio files and optionally, designated timing configurations as well as ACP 106 configuration from the smartphone 102 to the ACP 106.

Optionally, computing devices 120 are used to transmit audio files or messages to app 108 on device 102 which is then used to forward these to ACP 106. These devices may include PCs, laptops, tablets or other computing hardware.

App 108 manages the audio files for playing on ACP 106 and also the configuration of ACP 106. Configuration and audio files are communicated to ACP 106 via Bluetooth connection 104. Users can download audio files from other sources, store them in a library in the app 108, and select which files are to be sent to ACP 106 along with selecting the timing control of each audio file. App 108 allows for recording the user's own message on the phone 102 and sharing with other app 108 users via normal data channels.

ACP 106 supports a social messaging capability wherein a smartphone application allows a friend to record a short audio message and send it to a friend known to be wearing the ACP device 106. The audio file is transferred to the friends smartphone via normal data channels, and is then sent via the Bluetooth connection 104 to the ACP 106 worn by the user. The audio message will then play, immediately or just like any other audio clip stored on the device.

Optionally, the user of app 108 on phone 102 can register at a related online service 140, similar to other social media as known in the art. The user will then be able add friends who also have the app 108. App 108 will allow a user to record messages and save them for personal use, or send them connected friends for them to listen to if desired. App 108 preferably allows the user to store a large number of short audio clips on the app and select a number of them to be sent to the ACP 106. Preferably a user specifies a programmable play interval for each selected audio clip using app 108.

Optionally, a user can register with a website 142 supporting a service related to ACP 106. The website allows access to a large selection of short audio clips to save in the app 108, and then send to the ACP 106. Unrelated websites 144 may also contain short audio clips intended for use with the ACP 106.

Preferably ACP 106 can pair with any smartphone or computer supporting Bluetooth capability, optionally version 4.0 or higher. Optionally more than one ACP 106 may be paired with a smartphone 102 but communication is preferably with one ACP 106 at a time. The Bluetooth connectivity of ACP 106 preferably includes security measures as known in the art to prevent pairing of ACP 106 with unauthorized smartphones. Preferably, status related information of ACP 106 should be provided to app 108 including but not limited to battery charge state, number of clips loaded, social messaging enabled/disabled, and so forth.

In normal operation, following pairing via Bluetooth to a phone 102 or computer, and after the desired audio clips have been selected to be sent to ACP 106, and after ACP 106 has been enabled, ACP 106 will remain in a deep sleep mode to conserve power, preferably waking up for a one-second tick or to service the user button, or Bluetooth connection or optionally capacitive touch sensors. At programmable intervals, the ACP 106 will wake up, play an audio clip transferred from the smartphone, and then return to sleep mode.

As shown in FIG. 1B, a standalone version of the ACP where audio clips are stored on the device and smartphone does not have to be in communication range, only to load the audio clips. For example, The ACP will allow storage of approximately 20-30 (TBD) short audio clips. The user could load up the ACP in the morning, leave the smartphone at home, and the ACP will still function normally.

An app 208 runs on a smartphone or mobile phone 202 which is a computing device as described above. App 208 is designed to allow a user to interact with and program the ACP 206 as further described below. ACP 206 is preferably identical to ACP 106 of FIG. 1A. App 208 is preferably upgradeable as known in the art to add features and functionality.

Smartphone 202 comprises Bluetooth hardware such as an antenna and electronic circuitry and provides means for apps running on smartphone 202 to access the Bluetooth hardware. App 208 makes use of Bluetooth hardware to create a wireless Bluetooth connection 204 with ACP 206. App 208 uses the Bluetooth connection 204 for transferring audio files 210 and designated timing configurations 212 as well as ACP 206 configuration from the smartphone 202 to the ACP 206. As illustrated, at the designated time 212 for playing an audio file 210, ACP 206 wakes up from a power saving mode and plays audio file 210.

Figure 2:
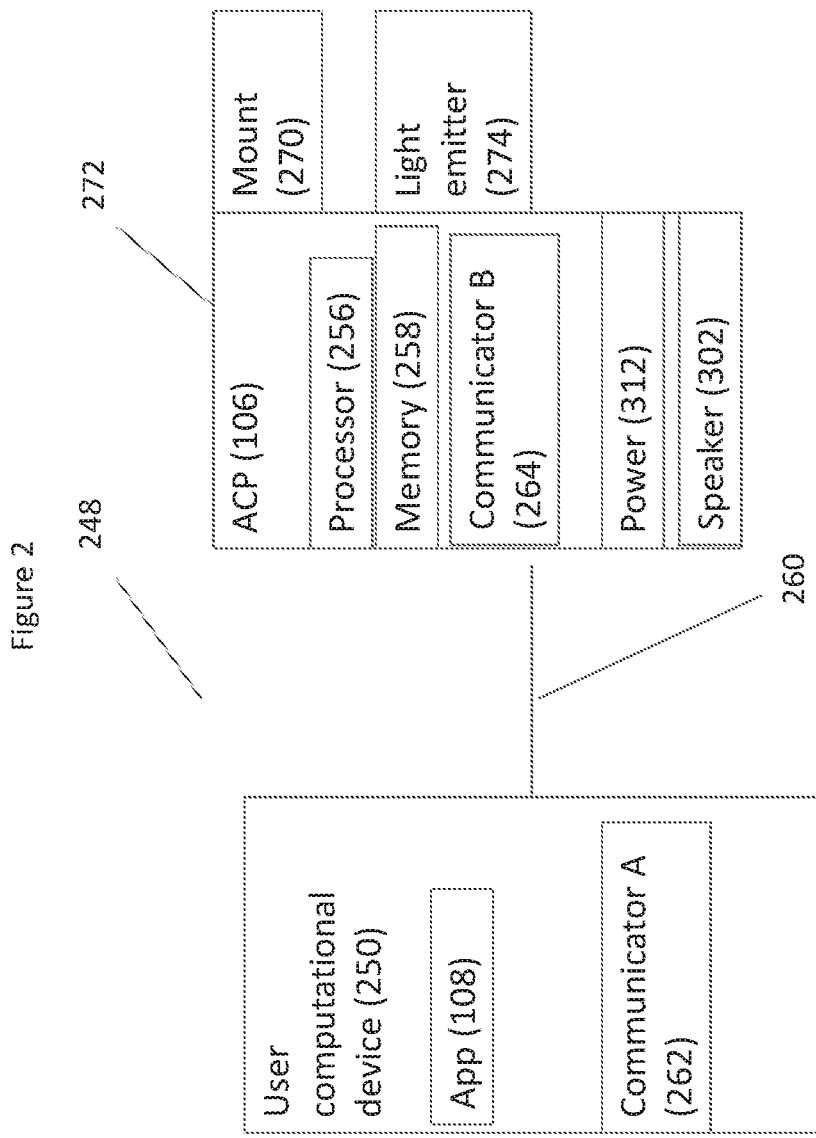
FIG. 2 is a schematic diagram showing the structure of an ACP and its components according to at least some embodiments of the present invention.

Reference is now made to FIG. 2 which is a schematic diagram showing the structure of an ACP 106 according to at least some embodiments of the present invention, in a system 248. ACP 106 is in communication with a user computational device 250 through a communication channel 260, which may optionally be wired or wireless.

As shown ACP 106 comprises the following components.

Power 312 is preferably sized to allow use of the device for up to 18 hours before needing recharging. Optionally power 312 is implemented as a rechargeable battery. Optionally power 312 has enough capacity for 48 hours of use without recharging. Power 312 is preferably a lithium-ion battery but may be based on any suitable material as known in the art, for example having an AH rating of 15 mA-Hr.

The optional wireless power charging circuit may optionally use wireless charging technologies including but not limited to, one of RF charging, inductive charging, or similar for charging power 312. Optionally, ACP 106 is placed in a charging "dock" to wirelessly recharge power 312. Alternatively, a charging port such as a USB port is provided on ACP 106 for wired charging.

ACP 106 also preferably features a processor 256 for executing commands and controlling the various functions of ACP 106. Processor 256 may optionally comprise any type of microcontroller, for example.

Audio data is preferably stored in a memory 258, from which processor 256 can read the audio data and cause it to be audibly displayed, or played, by a speaker 302. Speaker 302 preferably features good audio fidelity, optionally comprising a 100 mW speaker that covers the 20 Hz to 20 Khz frequency range.

Optionally, memory 258 also stores one or more commands regarding when to play the audio data, as described in greater detail below. Alternatively, such commands may optionally be received from computational device 250.

Computational device 250 preferably operates an app 108 for receiving input through a user interface, and for transmitting audio data and/or one or more commands to ACP 106 accordingly.

ACP 106 comprises a communicator B 264, while computational device 250 comprises a communicator A 262, for supporting communication through communication channel 260. As a non-limiting example, communication channel 260 may operate according to Bluetooth. Optionally standard or low energy (LE) Bluetooth may be used.

ACP 106 are optionally enclosed by a housing 272, comprising a suitable material such as metal, plastic or glass, or any other suitable material or combination thereof. Housing 272 may optionally contain the entirety of ACP 106 or alternatively may optionally be mounted on a mount 270 as shown.

Optionally, housing 272 comprises a light emitter 274 for emitting light, for example according to commands communicated through the wireless communicator, for example as an LED. Light 274 optionally provides an indication of one or more of charge status, or Bluetooth pairing status.

ACP 106 preferably has a typical diameter of 5-20 mm Audio received by or generated through app 108 in other formats is converted to the desired format by app 108 in user computational device 250, which may optionally be any type of computational device as described herein, according to any suitable audio format.

Figure 3:
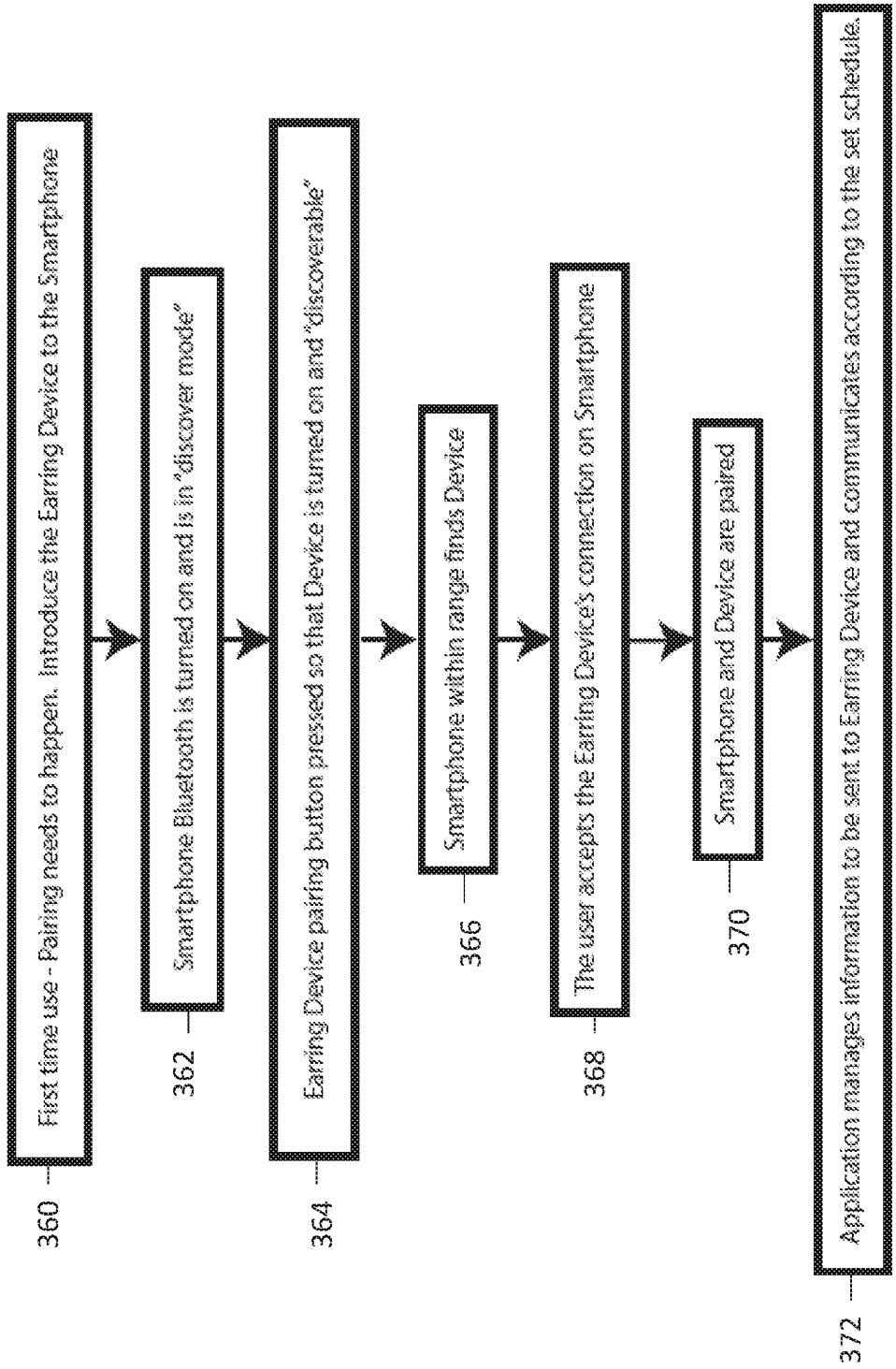
FIG. 3 is an exemplary, non-limiting method for connecting an earring device to a smartphone or other mobile device for the first time and for then sending information according to at least some embodiments of the present invention.

Turning now to FIG. 3, an exemplary, non-limiting method is shown for connecting an earring device to a smartphone or other mobile device for the first time and for then sending information. As previously described, the earring may optionally be implemented in a variety of ways. Furthermore, optionally a variety of smart communication devices may be used, also as previously described.

As shown in stage 360, if the earring device has not yet been connected to, or in communication with, the smartphone or other mobile device, then pairing needs to happen. Pairing is therefore required when first-time use is detected. In stage 362, the Bluetooth communicator of the smartphone is turned on and is in "discover mode." This enables the smartphone to pair or communicate for the first time with other Bluetooth enabled devices. Of course, many other communication modes besides Bluetooth may actually be used. In this case, Bluetooth is given as a non-limiting example only.

In stage 364, the earring device pairing button is pressed so that the device is turned on and is "discoverable." Optionally, if a separate pairing button is not provided, then if the earring device's power switch is pressed and then held, the device may enter pairing mode, so that its Bluetooth communicator would be accessible, or that is to say, discoverable to an external device.

In stage 366, if the smartphone is within range of the communicator, then the smartphone locates the earring. In the case of Bluetooth, the range required is Bluetooth range. In stage 368, the user accepts the earring device's connection on the smartphone. This is a security measure, which enables only selected devices to pair with the smartphone.

In stage 370, the smartphone and the device complete the pairing process and are now paired.

In stage 372, the application on the smartphone manages information to be sent to the earring device, and communicates according to the set schedule.

Figure 4:
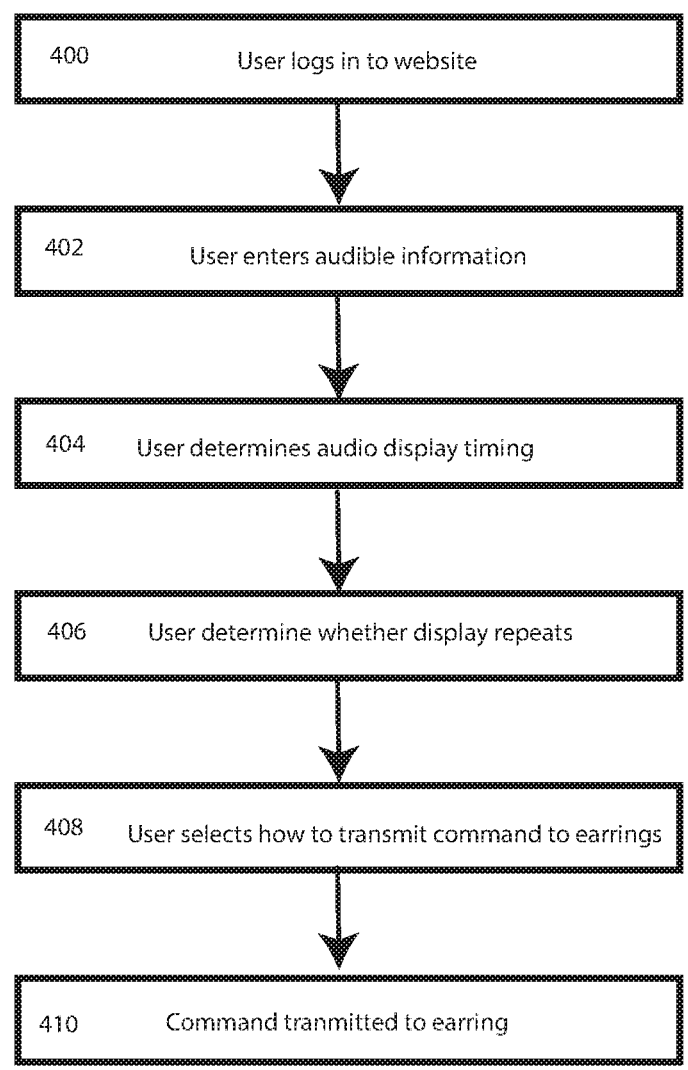
FIG. 4 is a non-limiting, exemplary method for controlling the earring through a smartphone application, website or web app according to at least some embodiments of the present invention.

FIG. 4 relates to a non-limiting, exemplary method for controlling the earring through a smartphone application, website or web app (collectively referred to as a website). As shown, in stage 400, the user logs into the website.

Next, in stage 402, the user enters one or more commands for controlling the earring, in terms of determining what will be audibly displayed through the earring speaker(s).

Now, in stage 404, the user determines when the information will be audibly displayed. Further description is provided below of the audio information as "whispers", which are discrete audio clips that are displayed through the speaker(s) of the earring.

Optionally, in stage 406, the user determines whether the display is to be repeated and if so, when.

Next, optionally in stage 408, the user determines how the command will be transmitted to the earring. For example, if the computational device on which the website or web app is being operated has a type of connectivity that can communicate with the earring, such as Bluetooth, RFID and the like, the computational device may communicate directly with the earring. Alternatively or additionally, the user may chose to cause such communication to occur through a smart watch or mobile communication device, in which case synchronization is performed with that device, to enable communication with the earring.

In stage 410, the command is transmitted to the earring.

FIGS. 5A-5D show an exemplary flow for sending a whispered message electronically—the automation of remote human whispering. The flow provides a method for whispering a message (sender) into the ear of a physically remote device (wearer).

Figure 5B:
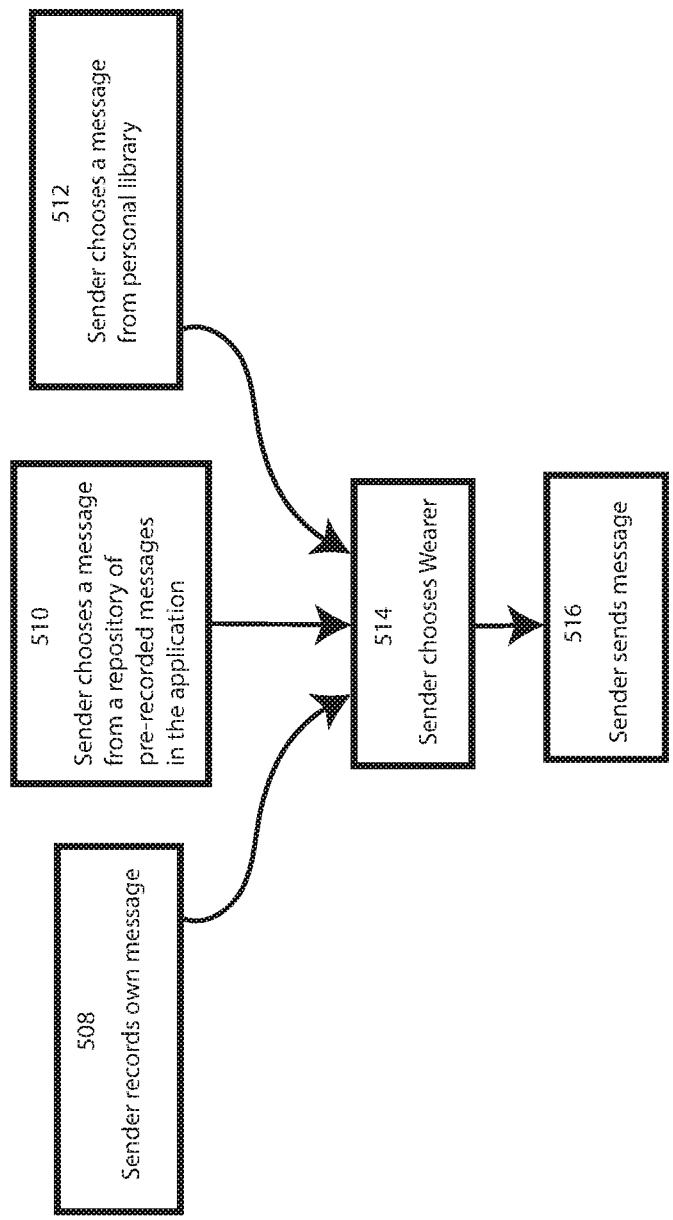

FIG. 5A shows the exemplary flow for the wearer and sender. Sender can send a message to wearer 500 (see for example FIG. 5B) and wearer has options to receive message 502 (see for example FIG. 5C) either immediately or whenever she chooses depending on the sender. Wearer can send messages to self 504 making the wearer also the sender. Messages can come from many sources 506 (see for example FIG. 5D) and can be managed by both sender and wearer.

FIG. 5B shows the exemplary flow for the sender actions. Sender initiates the flow by deciding to send a message to wearer. The sender has a number of choices, including but not limited to, recording their own message 508; choosing a message, from a repository of pre-recorded messages in the application 510; or choosing a message from sender's personal library 512.

Once the sender has chosen the message, the sender chooses the wearer 514, and then sends the message 516, for example through the smartphone app as described in greater detail below.

FIG. 5C shows the exemplary flow for the wearer actions. Wearer hears the scheduled message 518 as if someone were talking quietly directly into wearer's ear.

Optionally, the wearer who has allowed a sender's messages to be delivered in real time directly to earring, 520 receives sender's message, hearing the message immediately 522. Alternatively or additionally, the wearer who has not allowed sender's messages to be delivered directly to earring 524 receives notification of message. Wearer can then choose one of the following in stage 526: listen to the message immediately, listen to the message later, or delete the unheard message.

Wearer may then optionally choose an action after hearing the message 528 within the application. Wearer can choose to: repeat message, save message to a personal library or list, or delete message.

Figure 5D:
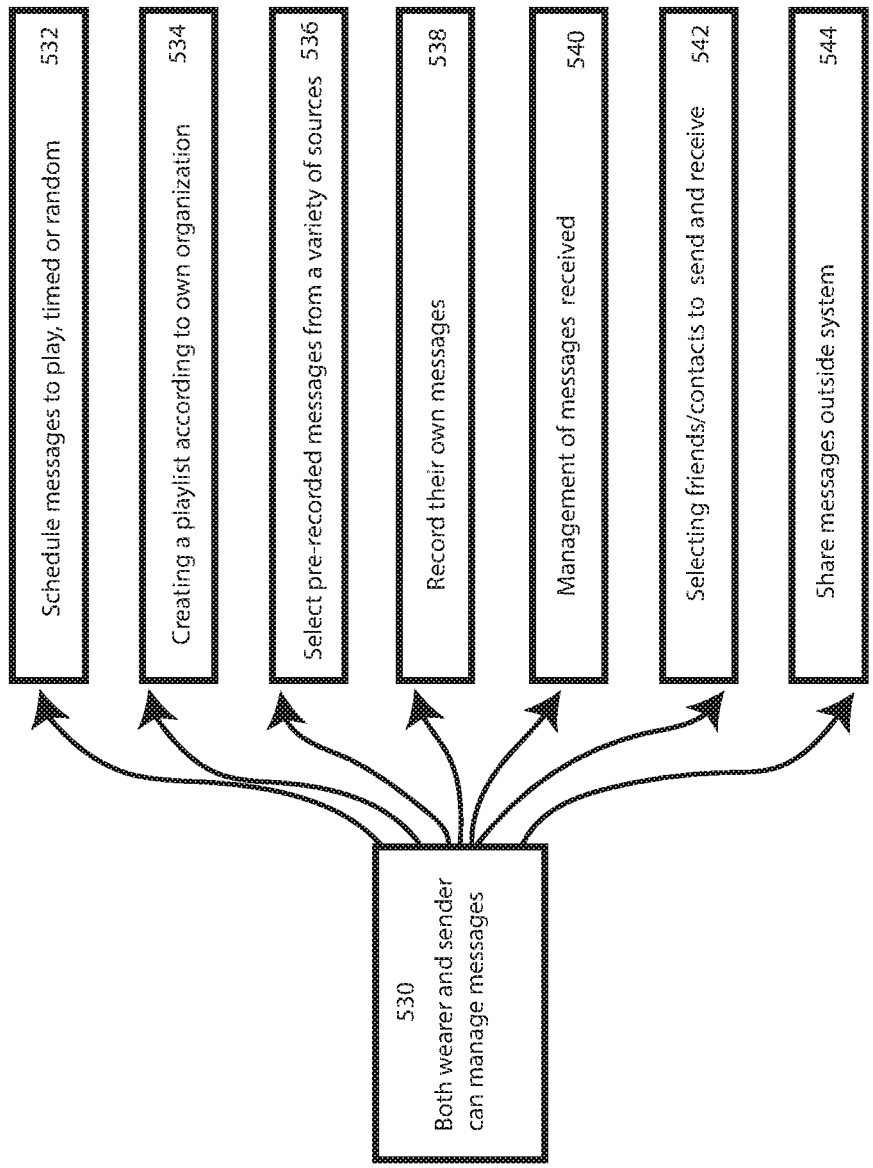

FIG. 5D shows that messages are optionally managed by both wearer and sender 530, depending upon the permissions provided the wearer to the sender. Each such user (wearer and sender) may optionally perform one or more of schedule messages to play at random throughout the day or at specific times 532, create a playlist according to own organization 534, select pre-recorded messages 536 derived from a variety of sources including but not limited to: audio clips from music and video, people speaking their own messages or quotes from literature, the internet or other media; record own message 538 attributing information to proper source with ability to hyperlink to more information; and manage messages that are received 540.

Each user may optionally select friends/contacts 542, obtaining mutual approval—includes defining friends who can send messages directly to earring device, as shown in more detail with regard to FIG. 6K.

Each user may also optionally share messages (i.e. export) to other social media, blogs, other internet locations 544.

Figure 6A:
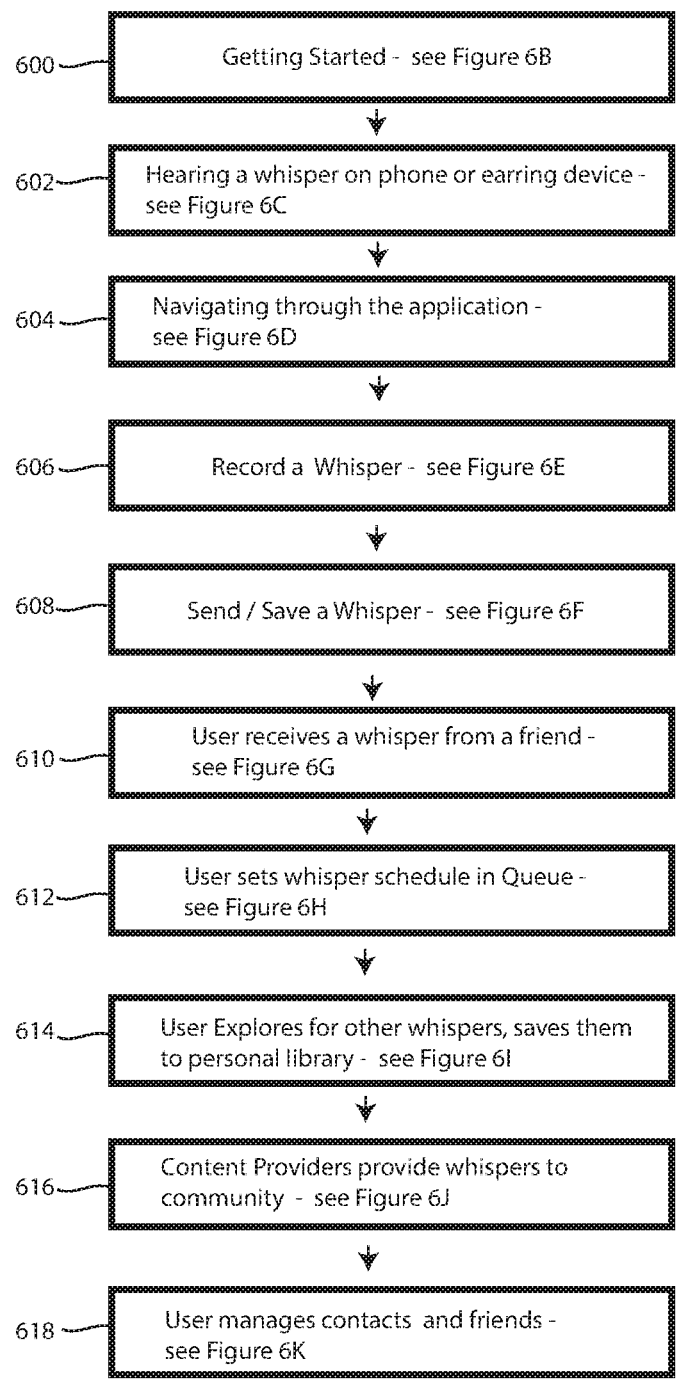
Figure 6B:
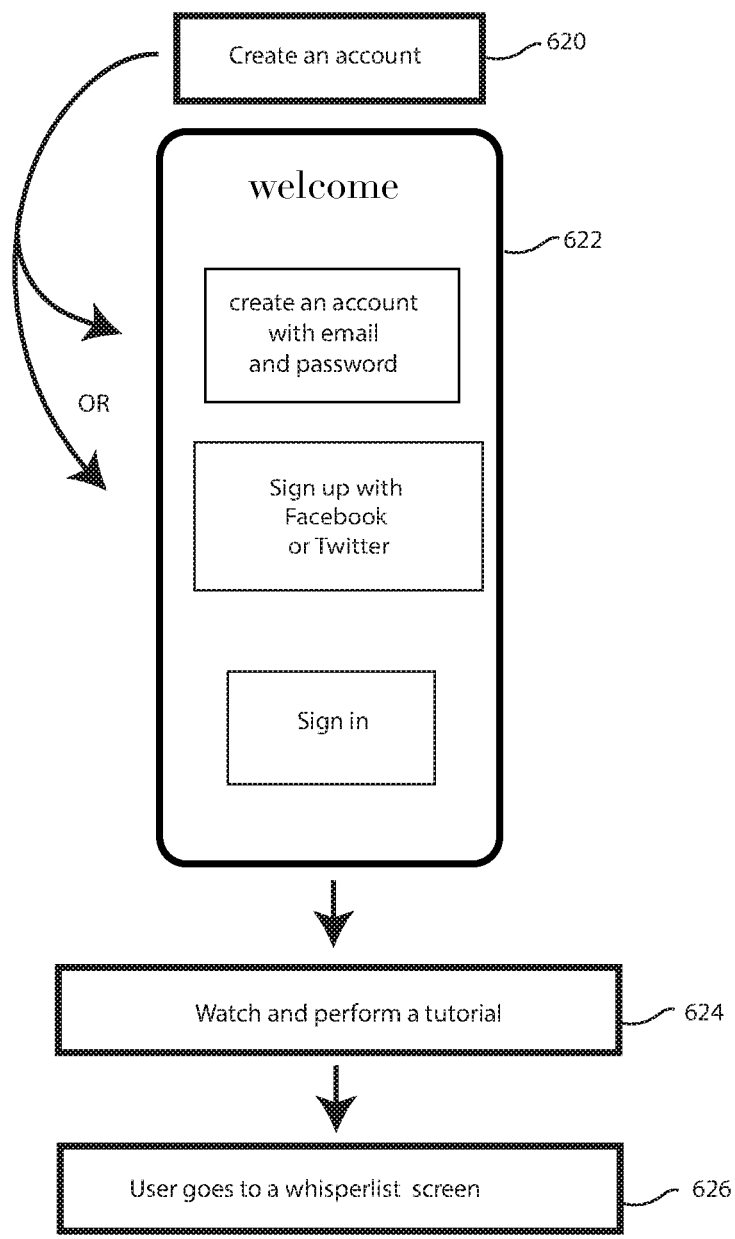
Figure 6C:
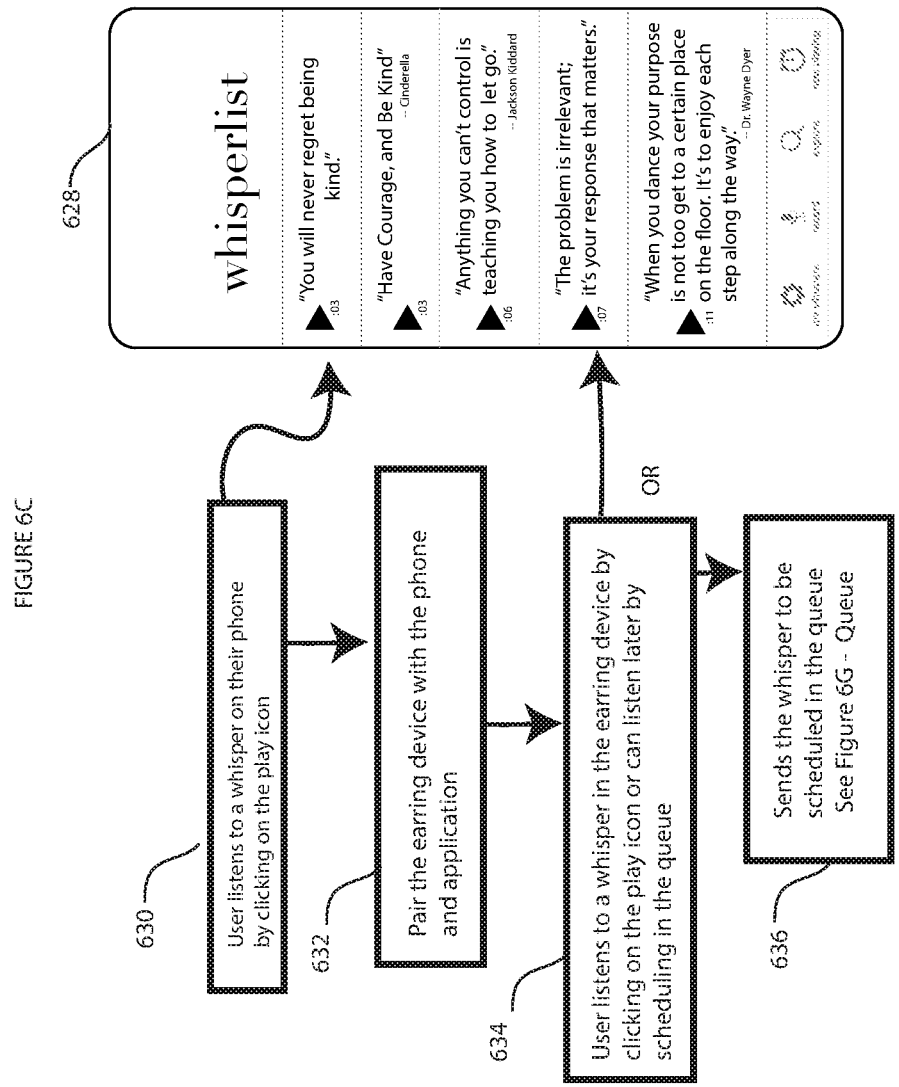

FIGS. 6a through 6b show a plurality of different methods for communication and for control between a mobile device and the earring device. In stage 600, the process begins with the devices communicating with each other, as shown in FIG. 6b. In stage 602, a whisper is heard on the phone or on the earring device, as shown in FIG. 6c. In stage 604, optionally a basic application navigation is performed, as shown in FIG. 6d.

Figure 6E:
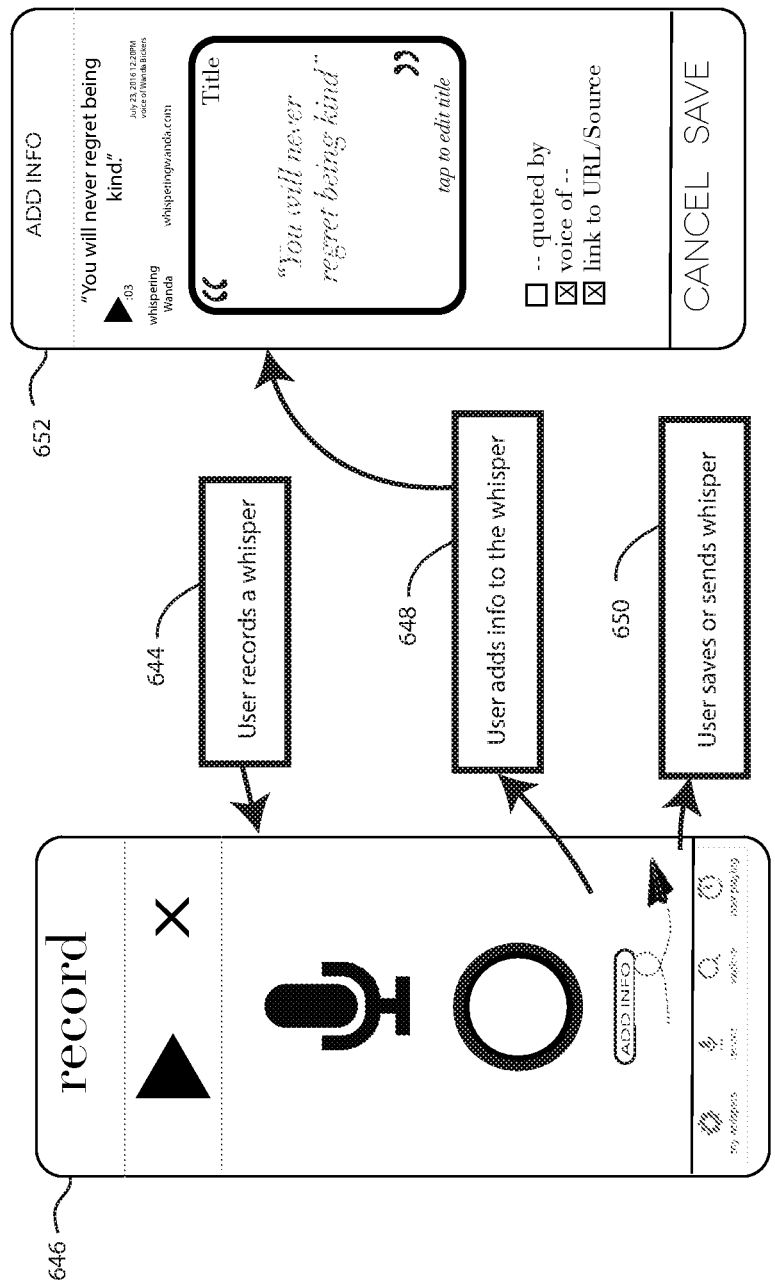
Figure 6F:
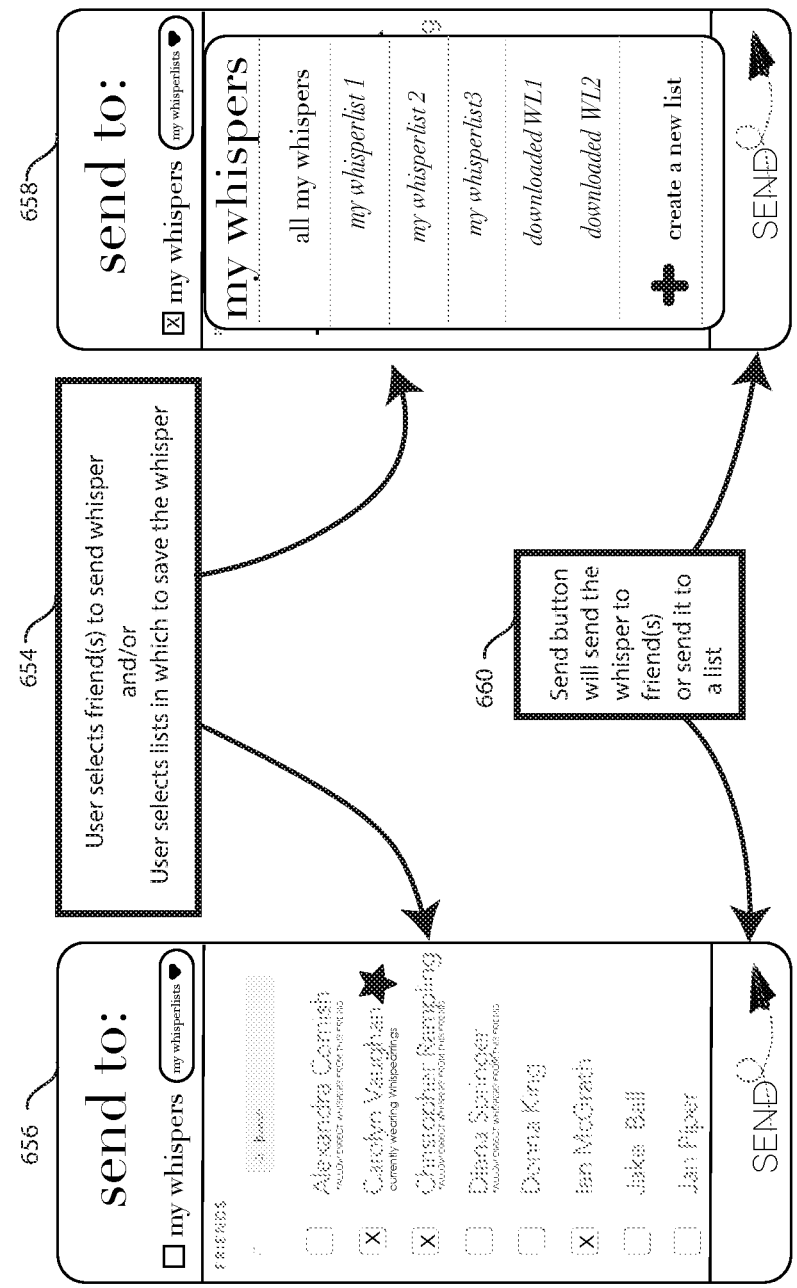
Figure 6G:
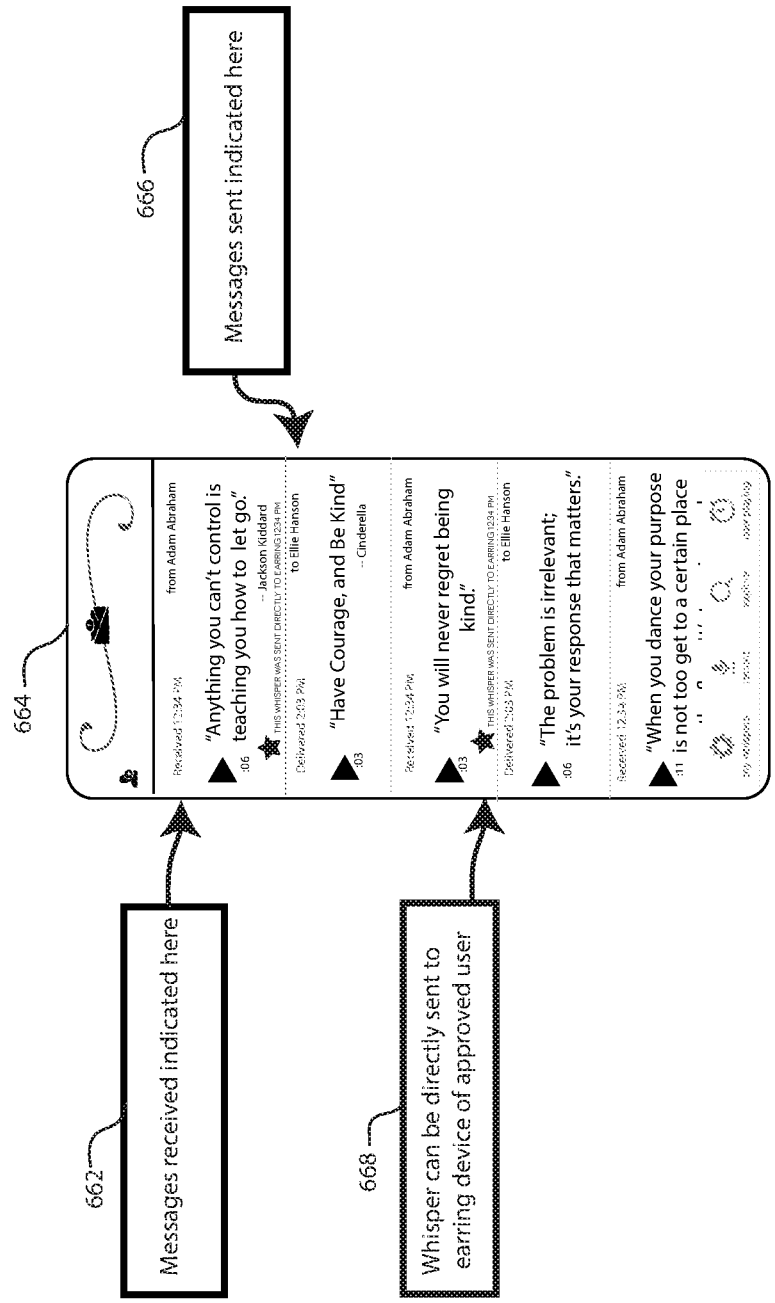
Figure 6H:
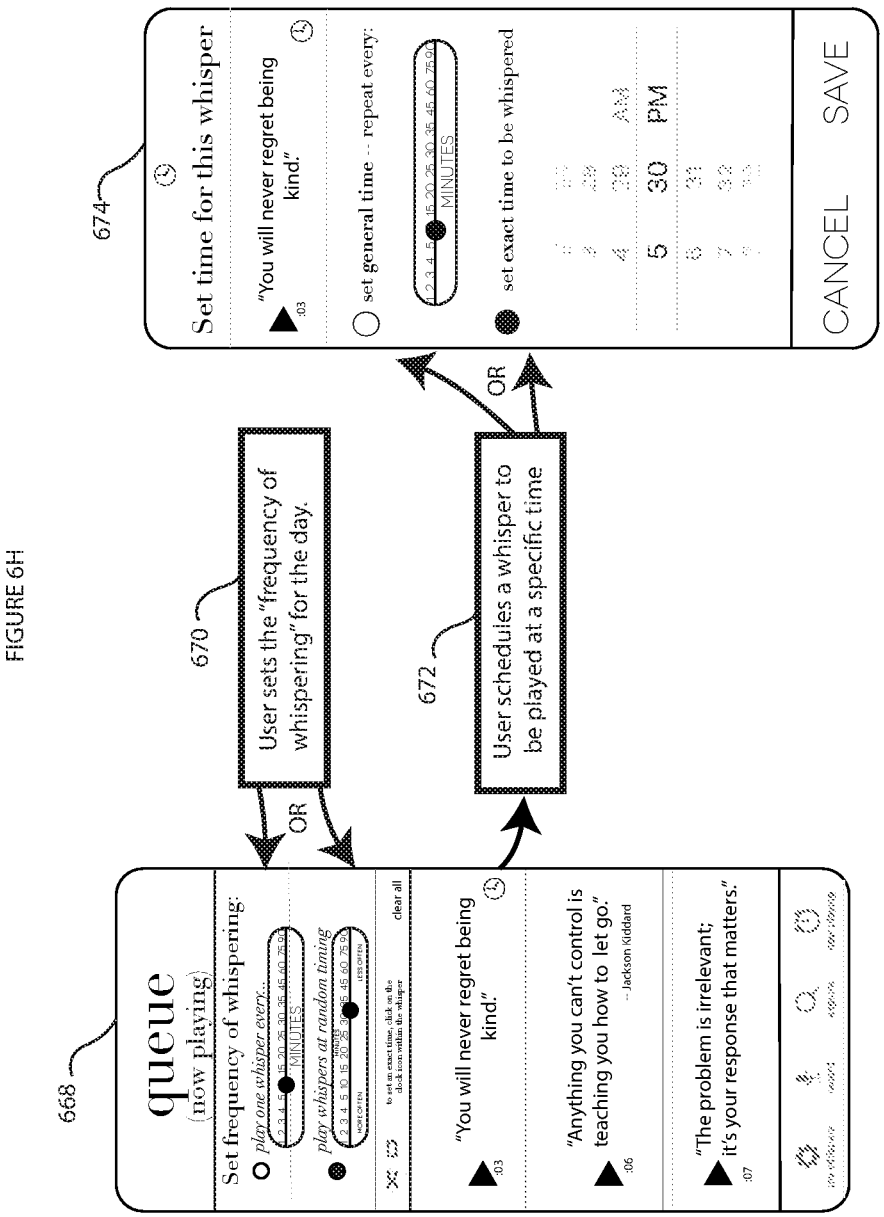
Figure 61:
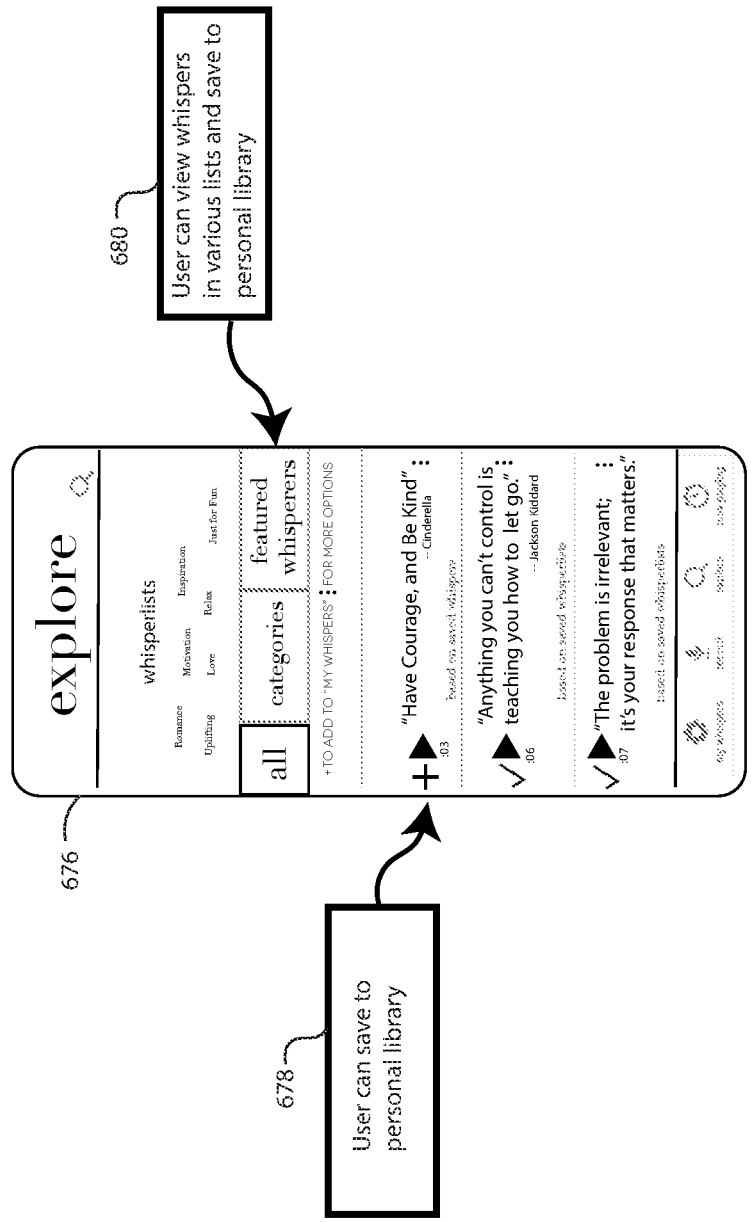
Figure 6J:
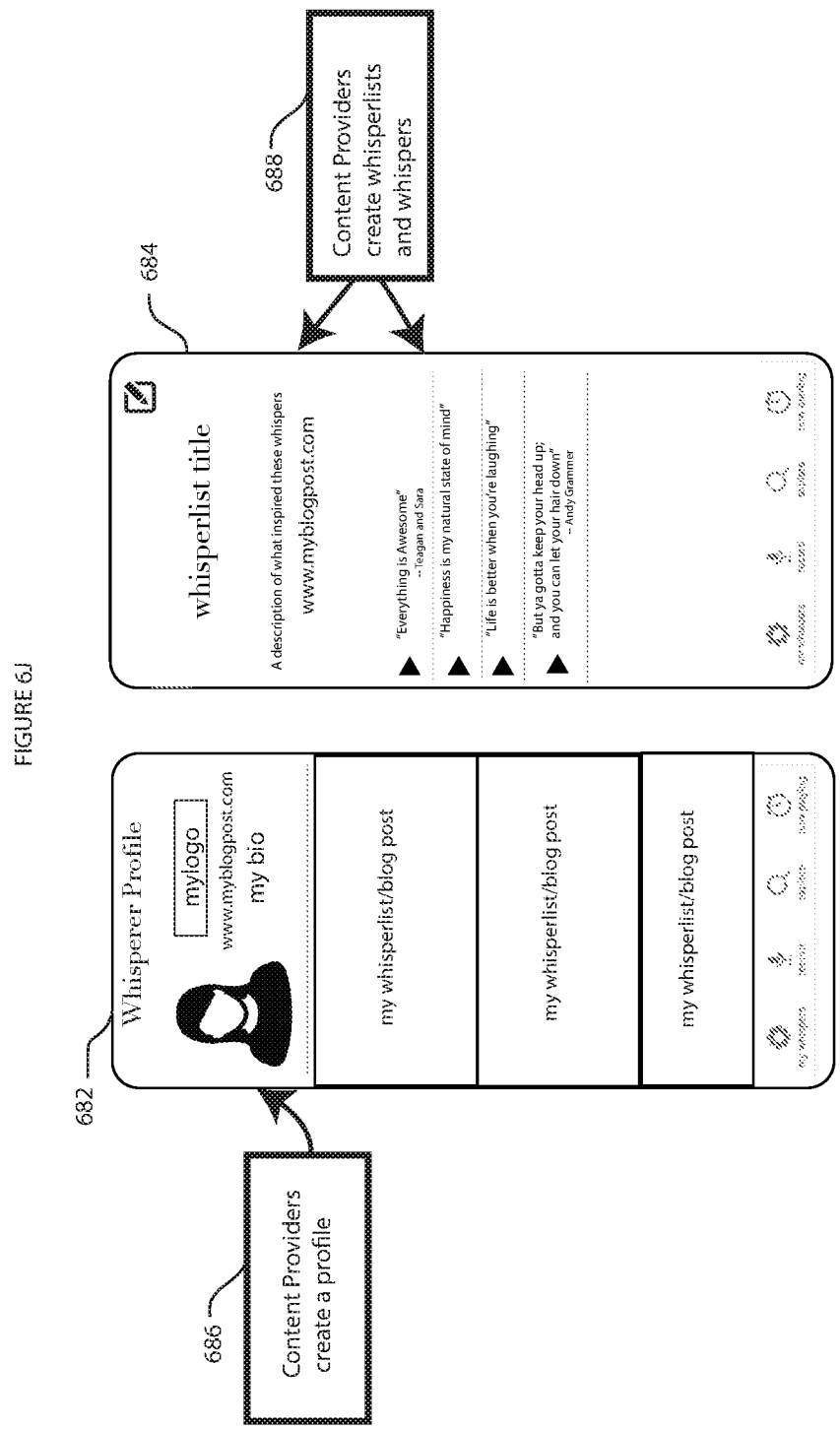

Stage 606 relates to recording a whisper, as shown in FIG. 6e. Stage 608 relates to sending and saving a whisper, as shown in FIG. 6f. Stage 610 relates to receiving a whisper from a friend by user as shown in FIG. 6g. Stage 612 relates to setting a whisper schedule in the queue, as shown in FIG. 6h. Stage 614, the user explores further whispers and then saves them to the personal library as shown in FIG. 6i. In stage 616, the content providers provide whispers to the community, as shown in FIG. 6j. In stage 618, the user manages contacts and friends as shown in FIG. 6k.

FIG. 6b shows that first the user is preferably required to create an account, as shown in stage 620. For example, a display to induce the user to create an account may optionally be made, which may for example include a button. Alternatively, the user may optionally be sent an invitation which includes a link to create the account. Pressing on such a display may lead to a welcome screen, as shown in stage 622, in which case the user has the choice to create an account with an email and password or to sign up with a social media channel, such as Facebook or Twitter. If the user has already created an account, then the user is invited simply to sign in.

Optionally, the first time that the user signs in or the first time that the user creates an account, in stage 624, the user is invited to watch and perform a tutorial. The tutorial may optionally walk the user through the steps of, for example, pairing the earring with the smart device for the first time, entering a whisper or receiving a whisper from an external source, scheduling the whisper to be played and the like.

By performing the tutorial, the user is optionally encouraged to perform these steps in tandem with the step-by-step interactive tutorial. After performing the tutorial in stage 626, the user then goes to a whisper list screen, which for example optionally includes a list of whispers, a list of whispers that are suggested, a list of received whispers and the like.

FIG. 6c relates to hearing a whisper on the phone or earring device. The goal, as shown in FIG. 6c, is optionally and preferably to enable the user to hear a whisper on the earring device. However, the user may wish to rehearse or first listen to the whisper on their phone. This option is given in stage 630, where the user listens to a whisper on their phone by clicking on the play icon.

A plurality of play icons is shown in box 628, which is a schematic of the user interface, which includes the previously described whisper list. Each whisper has, for example, the title of the whisper given, which may include phrases such as "You will never regret being kind," "Have courage and be kind," etc. Each one then lists, next to a play button, the amount of time each one takes to be played, such as three seconds, six seconds and so forth.

At the bottom of the screen 628, there is shown a setting for "my whispers", which includes a plurality of settings for how to control the device, a record button, in case the user wishes to record a whisper, explore, to explore other options, whispers available from other people, whispers which may optionally be available through coaching (as described in greater detail with regard to FIG. 10), and the like.

The icon "now playing" or alternatively called the queue, relates to the schedule of whispers for the near future, such as, for example, the next hour, the next few hours, the next 24 hours and the like.

Turning back now to the flow, after the user has listened to the whisper on their phone in stage 630, the user may then optionally pair the earring device with the phone and application in stage 632 if this has not already been performed. Optionally, this was already performed as described, for example, with regard to FIG. 3. In stage 634, the user listens to a whisper on the earring device by clicking on the play icon, or optionally can listen later by scheduling on the queue.

Optionally, listening on the smartphone occurs only when the earring is not paired.

Alternatively, in stage 634, the user may wish to schedule when the whispers will be played. In stage 636, the user sends the whisper to be scheduled in the queue, as shown with regard to FIG. 6g, which relates to the queue. By being scheduled in the queue, the user can choose when and how often the whisper is to be played.

Turning now to FIG. 6d, which relates to basic navigation through the application for a user, as shown in stage 638, the user may or may not want to connect with the earring device, and may optionally just use the application to create and manage whispers. Optionally, for example, the whispers may simply be played through a smartphone app and the like, and not through the earring device. Even if the user wishes to actually have the whispers played on the earring device, the user preferably manages the whispers on the phone. So as shown, in 640, there is provided a schematic diagram of an overall "My Whispers" app. The icons in the upper portion of the screen are to manage friends list, the gear indicates settings, and the envelope is to go to the notifications screen 642.

The app may optionally show a plurality of different whispers, such as all my whispers, different whisper lists, downloaded whisper lists and the like. In stage 643, the user navigates through the application using menu buttons or tabs, and again, the user may optionally create and manage whispers on the smartphone and then play them to the earring device, or alternatively, may even chose to play them on the smartphone.

Turning now to FIG. 6e, there is shown an exemplary non-limiting method for recording a whisper by the user. As shown in the flow, in stage 644, the user records a whisper. A schematic user interface is provided as shown in 646. The word "record" at the top indicates to the user that the user is to record a whisper. There are two buttons, including a microphone button and a big circle to press and hold while speaking. The triangle button is for playback and the x is to delete what was just recorded.

Once the user has recorded the whisper in stage 644, the user may optionally add information to the whisper, as shown in stage 648, in relation to the add info button, as shown on user interface 646. The user may then optionally save or send the whisper in stage 650 through the paper airplane icon.

Turning now to the add info screen, shown as 652, if the user optionally chooses to add information to the whisper in 648, then in the add info screen, the user may, for example, add information, such as the title "You will never regret being kind." This title may optionally be suggested via a speech-to-text function in the application as the whisper is recorded. Optionally, though, the user could tap to edit the title.

The user may optionally add attributions to go with the quote, such as check a box to include quoted by on the whisper card; if checked, optionally the whisper would have the name of the person who the quote is attributed to. The "voice of" attributes the person doing the speaking. Optionally the user can choose to have the quote read in a different voice than their own voice. In that case, the dashes to the right indicate different choices as to the type of voice or even a specific person's voice. Optionally, the application can include voice filters or voice changing software.

If the voice of box is not checked, then no attribution is listed on the whisper card. The user may also optionally link to the URL or source of the quote in case the user wishes to access more information about the source.

The user can always choose again to play the whisper using the play icon. If the user selects cancel, then the additional changes and information are not saved. If the user selects save, then they are saved.

FIG. 6f relates to choosing to save a whisper and/or to send a whisper to friends. Whispers may optionally be shared with friends directly from the user's application to a friend's application.

As shown in the flow in 654, the user selects friends to send the whisper to, and/or the user selects lists in which to save the whisper. So, in user interface 656, the user selects which friends to send the whisper to. In this case, for example, different friends are listed according to their name; a checked box indicates that they'll receive the whisper. A star indicates that that friend is currently active and is currently wearing the device, so sending it now may, if the friend has permitted, optionally send the whisper directly to the friend's earring so they hear it right away. For example, the whisper may optionally be sent as a message from one friend to another, to encourage the friend, for example as shown in FIG. 5.

If the friend is currently wearing the device, and for example they are in a stressful situation, the user would want to be able to send something directly to them live. To provide control as to when such "live" or direct messages are played, or if they are played at all, optionally the flow as shown in FIG. 6K is performed to manage which friends have this privilege "allow direct whispers from this friend" option.

Alternatively, or additionally, the user may optionally choose to send the whisper to one of their whisper lists, for example by selecting the preferred whisper list. Optionally, the user could send it to my whispers, which would be the complete list, or alternatively, the user may uncheck that, in which case, the different other whisper lists will appear with check boxes and the user will need to select to which list(s) the whisper is sent.

In stage 660, once the user presses the send button on either user interface, 656 or 658, the whisper will be sent to the friends or will be sent to the list, or both.

FIG. 6g relates to receiving a whisper from a friend. In stage 662, messages received are indicated in this particular box. So, for example, this particular list is "whispers from friends", shown in a UI 664. The symbol at the top with the scroll and the icon indicates that this relates to whispers that were received from others. In 662, the messages received are indicated, for example, with the word "from". In stage 666, the messages the user sent are indicated with "to". Optionally, different colors and the like, or a different order are shown to differentiate between them.

In stage 668, a whisper may optionally be sent directly to the earring device of the approved user, if the user is currently active.

FIG. 6h relates to setting a whisper schedule in the queue. So as shown in the queue, called "now playing", the frequency of whispering may be set, for example, in the queue shown in user interface 668. The user, for example, can set the frequency of whispering, for example to play one whisper every minute, play them at random timing. The user may optionally choose to play them every 30 minutes, every hour and the like. If the user selects random timing, then instead of being provided precisely every 30 minutes, it is provided less often approximately every 30 minutes, or more often approximately every five minutes etc.

In stage 670, the user optionally sets the frequency of whispering for the day, although of course the user could choose optionally to change the frequency during the day. Also, optionally, the user may set the frequency of whispering to be different times of the day, or different styles, so for example perhaps in the morning during the commute the user would prefer a steady whisper stream, whereas at work, perhaps, the user would prefer something more random. If the user knows that a meeting is up coming, optionally, the user can block off certain periods of time, so the user doesn't suddenly receive a whisper in the middle of a meeting or in a telephone call or some other time which might be problematic. Also, optionally, the user can always pause whispers on their smartphone device or alternatively also on the earring device as well, if the earring device for example comes with a pause button.

In stage 672, the user optionally schedules whispers to be played at a specific time. So for example, whispers may be played at random timing, but the user may also prefer that certain whispers be played at certain times. User interface 674 shows how to set a time for a particular whisper. The whisper card itself is listed at the top, with the title, in this case, "You will never regret being kind." Either a general time is set, to be repeated every set number of minutes, or an exact time to be whispered, in this case, shown as 5:30 PM. Once it is saved, then the whisper will be played back at that specific time.

FIG. 6i relates to the ability of the user to obtain other whispers for personal use. The user can view whispers from others, from the application library or from content providers called "whisperers", and to save them to a particular personal library. As shown with regard to user interface 676, the user can chose to explore different whisper lists, for example, various whisper lists are shown, including romance, uplifting, love, motivation, relax, inspiration, just for fun and the like.

The user may optionally choose to search by the selection of all categories, by any of the above categories, or by featured whispers, for example, those whose whispers have proven to be very popular and/or celebrities or coaches or featured whisperers (see for example FIG. 14) according to the user's preferences. The user's preferences may optionally also be learned automatically.

In stage 678, the user may select a particular whisper and save it to the user's personal library, for example, by clicking the plus button. Once the plus button has been clicked, then the whisper is shown with a checked box next to it. The user can view whispers in various lists and save them to their own personal library, as shown in stage 680.

Turning now to FIG. 6j, the user may optionally also become a content provider to offer whispers (for example see FIGS. 10-14 about the business methods that would prompt a user to become a content provider). So, as shown in UI 682, the user has created a whisperer profile. Optionally, with a photo, a logo, URL, for example, myblogpost-.com, my bio and the like. The user, as a content provider, creates a profile in stage 686, including this information, optionally a whisper list or blog post, and other information.

Optionally, the user may have multiple such whisper lists or blog posts, which another user may optionally choose to subscribe to or read, as shown in user interface 684, a whisper list title is given which may for example be the title of the list for the content provider overall. There is also optionally a description of what inspired these whispers, which may, for example, be a website or a blogpost, and then the content providers create the whisper lists and provide whispers in stage 688.

Turning now to FIG. 6k, the user may optionally, through user interface 690, manage contacts and friends. This user interface 690 shows the user's contact list, in which the user selects which friends to interact with in the application in stage 692, for example, adding contacts as friends, blocking or removing them. Additionally, the user can designate a friend the special status to "allow direct whispers from this friend" 694 and see an indicator (in this non-limiting example, a star) that a friend is currently wearing the earring device.

Figure 7:
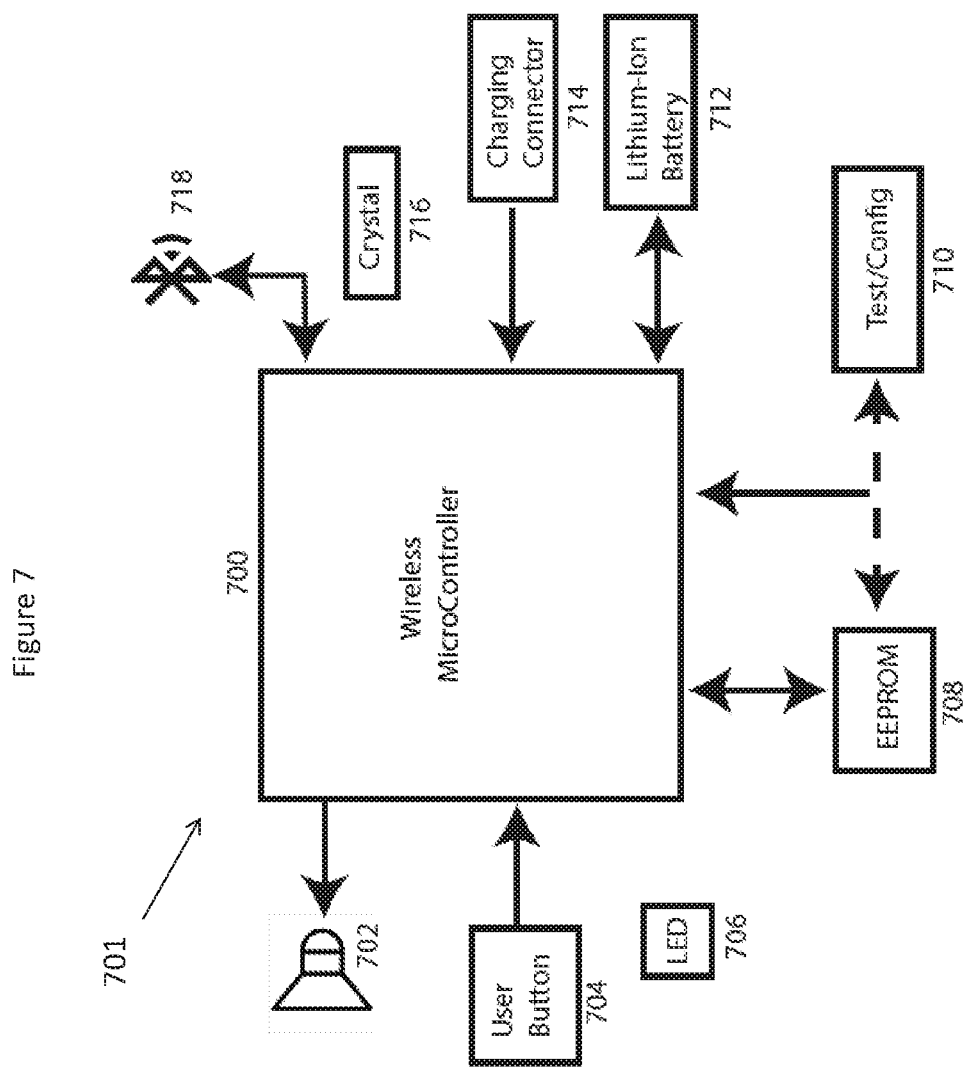
FIG. 7 shows an exemplary, non-limiting version of a further implementation of a device for providing whispers, which may actually be worn as an earring according to at least some embodiments of the present invention.

FIG. 7 shows an exemplary, non-limiting version of a further implementation of a device for providing whispers, which may actually be worn as an earring. It should be noted that FIGS. 7, 8, 9A and 9B, are preferably alternate views of an embodiment of ACP/whisper device 106. As shown in a device 701, there is provided a wireless microcontroller 700. Device 701 optionally and preferably comprises a speaker 702 and a wireless communicator 718 for two-way wireless communication. As previously described optionally such wireless communication may include Bluetooth, WiFi, RFID, and the like. A user button 704 communicates with wireless microcontroller 700 to receive input. The user button 704 may optionally relate to power control (powering device 701 up and down), but device 701 may also alternatively feature more than one such button. Such buttons 704, for example, may optionally relate to power control but also for adjusting volume, hearing, communicating, receiving, pausing audio display of the whispers and any other function which is considered to be suitable.

An LED 706, which is controlled by wireless microcontroller 700, optionally shows that the device 701 is powered on, but may also optionally be used to provide various signs. For example, if there's a plurality of LEDs, they may turn different colors, they may optionally display one steady color, or blink and the like. An EEPROM (electrically erasable programmable read-only memory) 708 is provided for storing factory configuration data, voice prompts and other audio data, and optionally any other temporary data, including without limitation the operational instructions and configuration of device 701. Alternatively, whispers can be stored in memory of microcontroller 700. A test configuration 710 connection provides access for factory testing and configuration data, to program EEPROM 708, and may optionally not be present when sold or otherwise provided to the consumer or end user. A lithium-ion battery 712 provides power to wireless microcontroller 700 and is in turn monitored by wireless microcontroller 700 to determine battery charge levels. A charging connector 712 is optionally used to charge lithium-ion 712 battery. The microcontroller 700 contains internal circuitry to safely connect the power from the charging connector 714 to the battery 712. Crystal 716 is used in the oscillator circuit for the wireless microcontroller 700. Crystal 716 provides a stable frequency reference to the microcontroller 700, necessary for reliable wireless communication.

FIG. 8 shows a further non-limiting implementation of the device, now shown with a side view. As shown for a device 801 which is an embodiment of ACP 106, there is provided a microcontroller 802 shown in the middle, which controls the functions of device 801. Microcontroller 802 and an EEPROM 806 are shown as mounted on a PCB 800, which is a PCB board. In addition, a charging jack 812 is mounted on the PCB 800. Charging jack 812 is also controlled through microcontroller 802. A speaker 810 is optionally connected to the PCB 800 with soldered flywires. The audio signals for speaker 810 are driven directly from the microcontroller 802. A switch 804 is shown, which is able to turn the device 801 off and on, or provide other functionality as described for switch 704 above. A battery 808 is also shown.

Figure 9B:
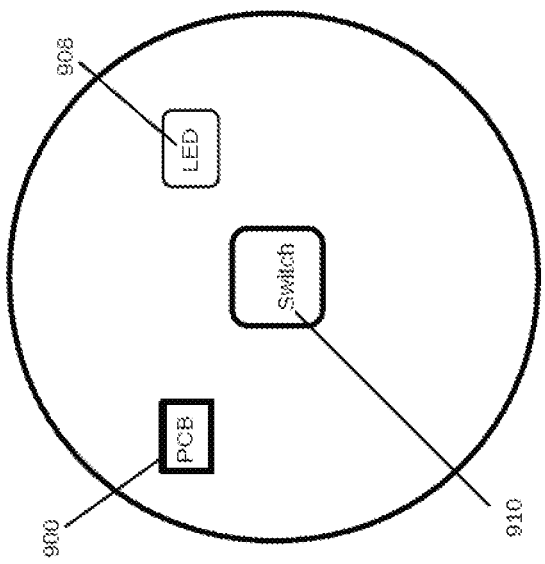
FIGS. 9A and 9B show a further exemplary embodiment of the PCB board shown as component side (FIG. 9A) and solder side (FIG. 9B) for a device for providing whispers according to at least some embodiments of the present invention.
Figure 9A:
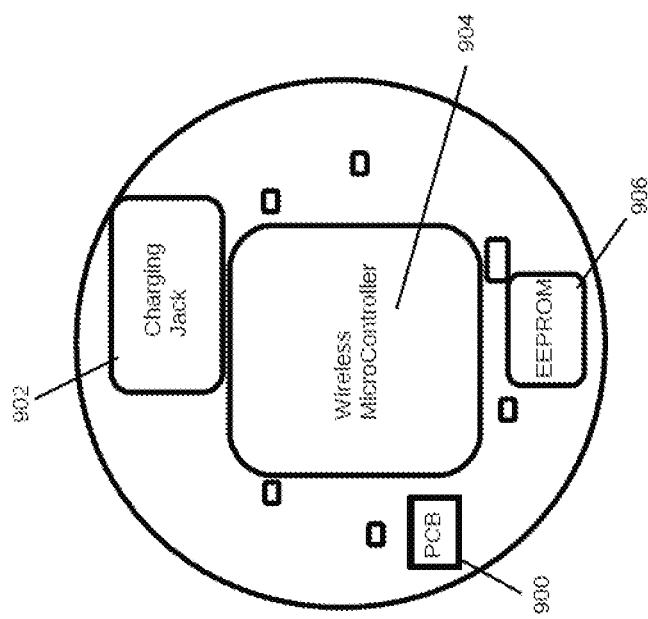

FIGS. 9A and 9B show a further exemplary embodiment of the PCB board shown as component side (FIG. 9A) and solder side (FIG. 9B). PCB 900 is the basis for an embodiment of ACP 106. On the component side (FIG. 9A), a PCB 900 is shown in communication with the EEPROM 906, a wireless microcontroller 904 and a charging jack 902. Turning now to solder side, shown on FIG. 9B, PCB 900 is connected to a switch 910 and also features an LED 908. In this case, the speaker is not shown. Alternatively, the arrangement of the PC board and its components can be rearranged differently and replaced for smaller assembly.

FIGS. 10-14 describe exemplary, non-limiting, illustrative applications of the earring (or ACP) system for social and emotional enhancement. Such applications include but are not limited to coaching, self-improvement, learning and memory improvement, and communications show how users with various emotional and psychological needs can be helped. They are methods created to address such qualities as being: distracted, forgetful, unmotivated, uninspired, not mindful, on autopilot mode, habitual in thought and action, triggered to reaction, unaware, judging, negative in self-talk, bored, resistant to change, hard to remember, low self esteem, forgetful, and discouraged.

Figure 10:
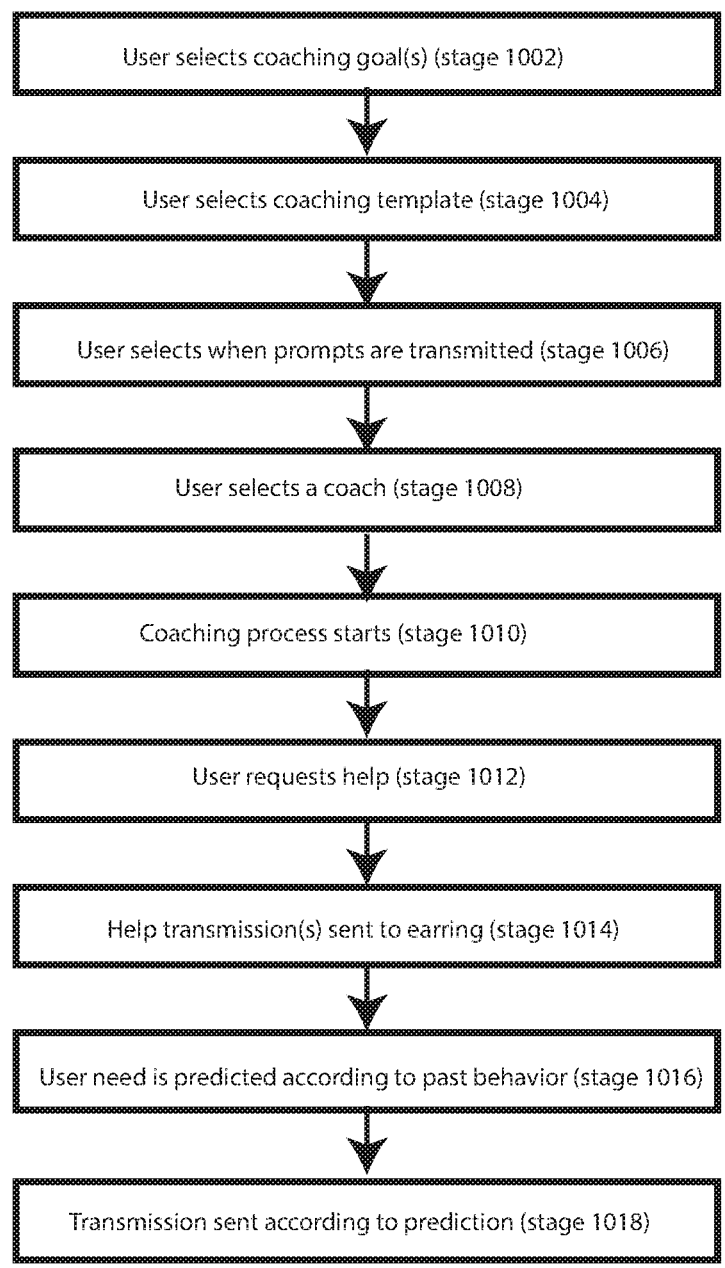
FIG. 10 shows a non-limiting, exemplary method 1000 for providing coaching through the earring according to at least some embodiments of the present invention.

FIG. 10 relates to a non-limiting, exemplary method 1000 for providing coaching through the earring. The audible displays provided through the earring are used to implement the coaching method, which for example and without limitation can help to provide one or more of the following: being encouraged by someone, overcoming addiction support, quitting smoking support, losing weight encouragement, exercise prompters, repeated activities prompter, coaching through something or even becoming a self-personal life coach.

As shown in stage 1002, the user selects one or more coaching goals. Such goals may optionally include but are not limited to losing weight, stopping smoking, ceasing drinking, stopping a pharmaceutical or chemical addiction, increasing exercise and the like.

The user may then optionally select a coaching template in stage 1004. For example, such a template may optionally relate to prompting the user to fill out a diary on what is happening and how the user feels, for example on a smart phone or other computational device. The earring preferably provides the prompt.

The user then preferably determines when the prompts are to be transmitted, for example according to frequency (hourly, daily etc.) and/or specific times of day (morning, afternoon, evening etc.), in stage 1006.

The user may optionally select a virtual or human coach to assist with the process, for example to send encouragement or other transmissions through the earrings, in stage 1008.

The coaching process then begins in stage 1010.

The user may optionally request help, for example through the smart phone or other computational device, in stage 1012.

After the user requests help, one or more specific transmissions may optionally be sent through the earring, for example according to the template and/or coach selected, in stage 1014.

Optionally, the user's needs are learned by the software, operated for example through the smart phone or other computational device, to predict when the user is likely to need help, in stage 1016.

Transmission is preferably sent as determined by software after learning user needs in stage 1018.

Figure 11:
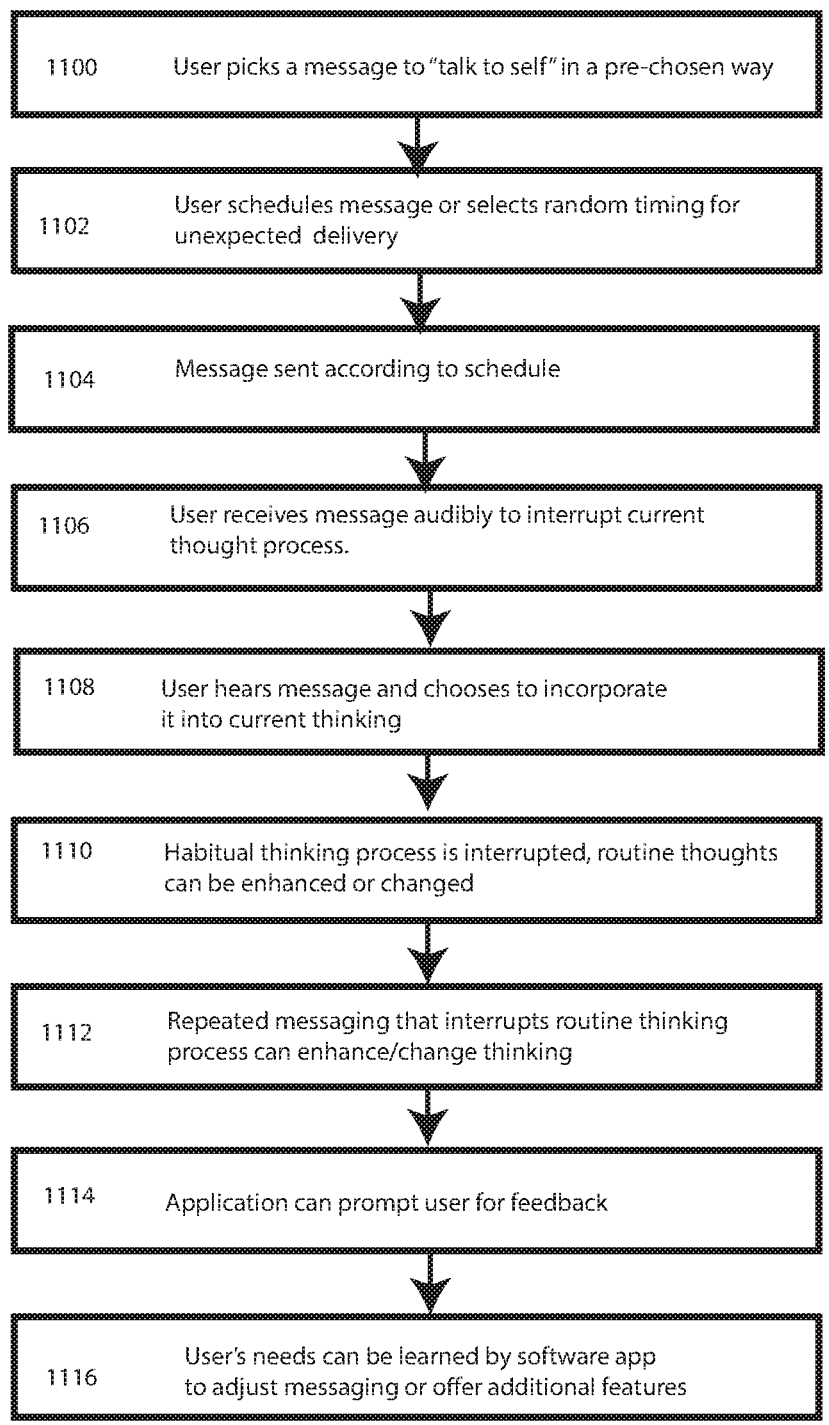
FIG. 11 relates to a non-limiting, exemplary method of self-improvement for a user of the earring, by supporting the user's desire for self-improvement.

FIG. 11 relates to a non-limiting, exemplary method of self-improvement for a user of the earring, by supporting the user's desire for self-improvement. It can be a tool for hearing uplifting messages throughout the day for any one or more of feeling good, looking good, becoming happy, inspiration, motivation, cognizant of the moment, gratitude, and mindfulness, or any other suitable message. Non-limiting examples of suitable messages would relate to one or more of consciously choosing what to think about, becoming more mindful, telling yourself who you want to be, being your own life coach, looking for the good in your day and encouraging words (where the "you" is the perspective of the user wearing the earring and receiving these messages). Other non-limiting examples relate to one or more of changing habits and self-improvement, managing thoughts and choices; body, mind and spirit care; instituting change in the user's behavior and physical reminders (drink water, get up and walk, etc.).

FIG. 11 shows the stages of a non-limiting exemplary method, in which the earring assists the user in engaging in desired "self-talk", to for example produce a desired change in the user's behavior. In stage 1100, a user picks a message in order to "talk to self" in a pre-chosen way 1100. The user schedules the message for a certain time or selects random timing for unexpected delivery, which relates to a surprise timing of delivery of the message, in stage 1102. As noted previously, the user may optionally block off certain periods of the day for receiving such messages.

The message is sent according to schedule in stage 1104. By sent it is optionally meant that the message is transmitted to the earring device, but preferably the message is transmitted in advance, and at this point is "sent" in terms of being audio displayed by the earring. The user receives the message audibly, which induces the user to consider this new thought, potentially interrupting less desired thought processes, in stage 1106. The user optionally provides feedback to the device and/or to the application in stage 1108, regarding whether the message is having a desired effect. Depending upon the feedback, the application or the device may optionally adjust the messages in stage 1110. This process is optionally repeated until a desired type or level of feedback is achieved in stage 1112. Alternatively, in stage 1114, the application and/or device determines that a particular type of message is not proving to be effective, according to the user's feedback, and then new or different messages (or types of messages) are transmitted. The user's needs can be learned by the software application to adjust messaging or offer additional features in stage 1116.

Figure 12:
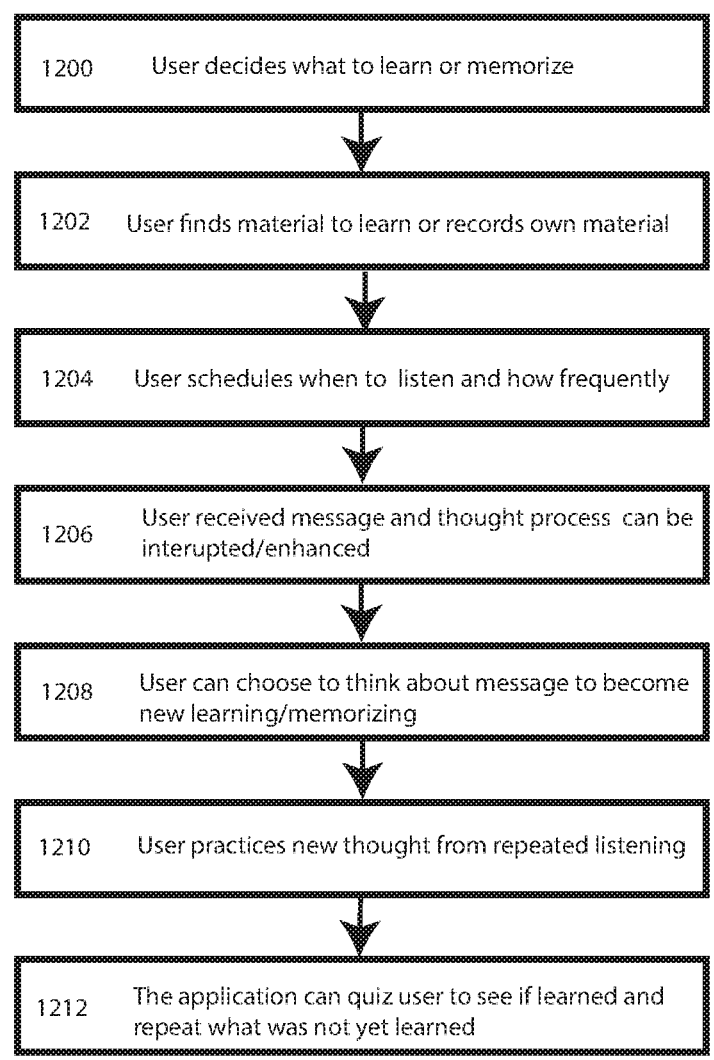
FIG. 12 relates to a non-limiting, exemplary method of learning and/or memory improvement.

FIG. 12 relates to a non-limiting, exemplary method of learning and/or memory improvement. Without wishing to be limited, such a method for learning or improving memory can help improve one or more of: attention skills, memory aid for learning a new language, adding daily vocabulary, cognitive conditioning, time reminders, alarm clock for remembering appointments, etc.; medical reminders (taking medications, breathing activities, muscle movement activities); exercise prompters and/or repeated activities prompter.

FIG. 12 show the stages of such an exemplary method in which a user might use the ACP or earring system for memory or learning. The user decides what to learn or memorize (stage 1200), then finds the material needed, such as new vocabulary words and definitions, or new language phrases or words to listen to repeatedly. Such information may optionally be available through the smartphone application or alternatively may be imported from an external source. Optionally, the user can record their own material to learn or memorize (stage 1202). The user then schedules when to listen and how frequently (stage 1204).

The learning/memorizing process begins when the user receives the message and hears it being audibly displayed by the earring (stage 1206). The user can choose to think about the message to become new learning or memorizing (stage 1208) and practices new thoughts from repeated listening (stage 1210) The user can repeat stages 1204-1210 until learned. The application can quiz the user to see if learned and repeat what was not yet learned (stage 1212).

Figure 13:
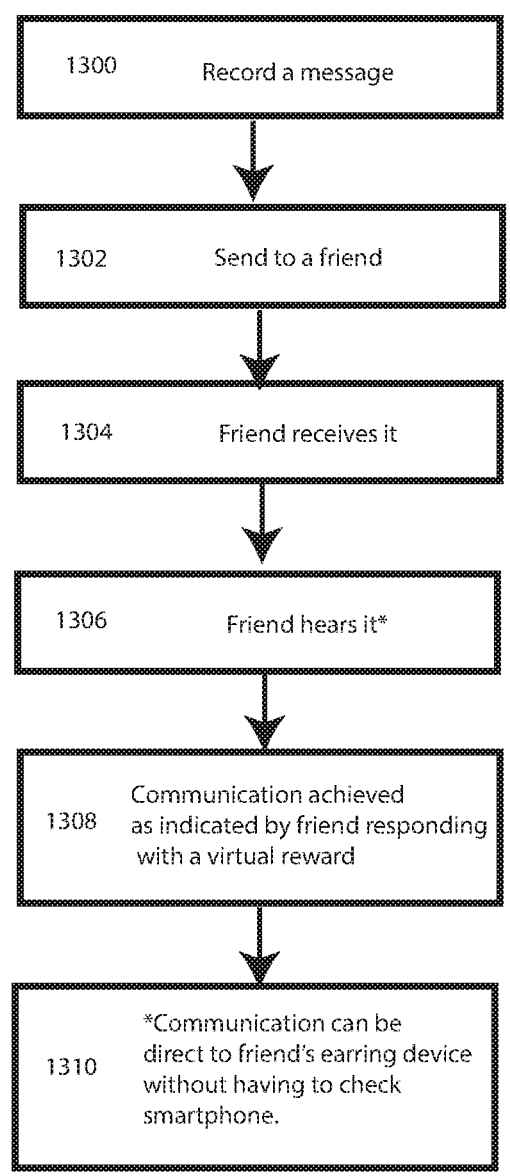
FIG. 13 relates to a non-limiting, exemplary method of communication, using the earring as described herein.

FIG. 13 relates to a non-limiting, exemplary method of communication, using the earring as described herein. Without wishing to be limited, the earring may optionally support a private form of distant communication, for example for uplifting, encouraging and affirming others and the user. It is a form of communication for connection, social interaction, entertainment, romance, or humor. One can communicate meaningful words, inspiring quotes, comforting voices for a social interaction of connection. The communication may optionally be performed through the smartphone application or alternatively directly from one friend to friend(s), directly communicated to earring without passing through the smartphone application (see for example FIG. 5).

The user records a message in stage 1300, then sends it to a friend in stage 1302, for example through the smartphone application. The friend receives it in stage 1304, for example through the smartphone application. The friend hears it in stage 1306 through an audible display by the earring. The friend may optionally choose to respond, for example optionally through the smartphone application in stage 1308, for example with a virtual reward such as emojis or stickers sent back to the application of the sender. Optionally, in stage 1310, such communication is sent directly to the earring of the friend, without passing through the smartphone application.

Figure 14:
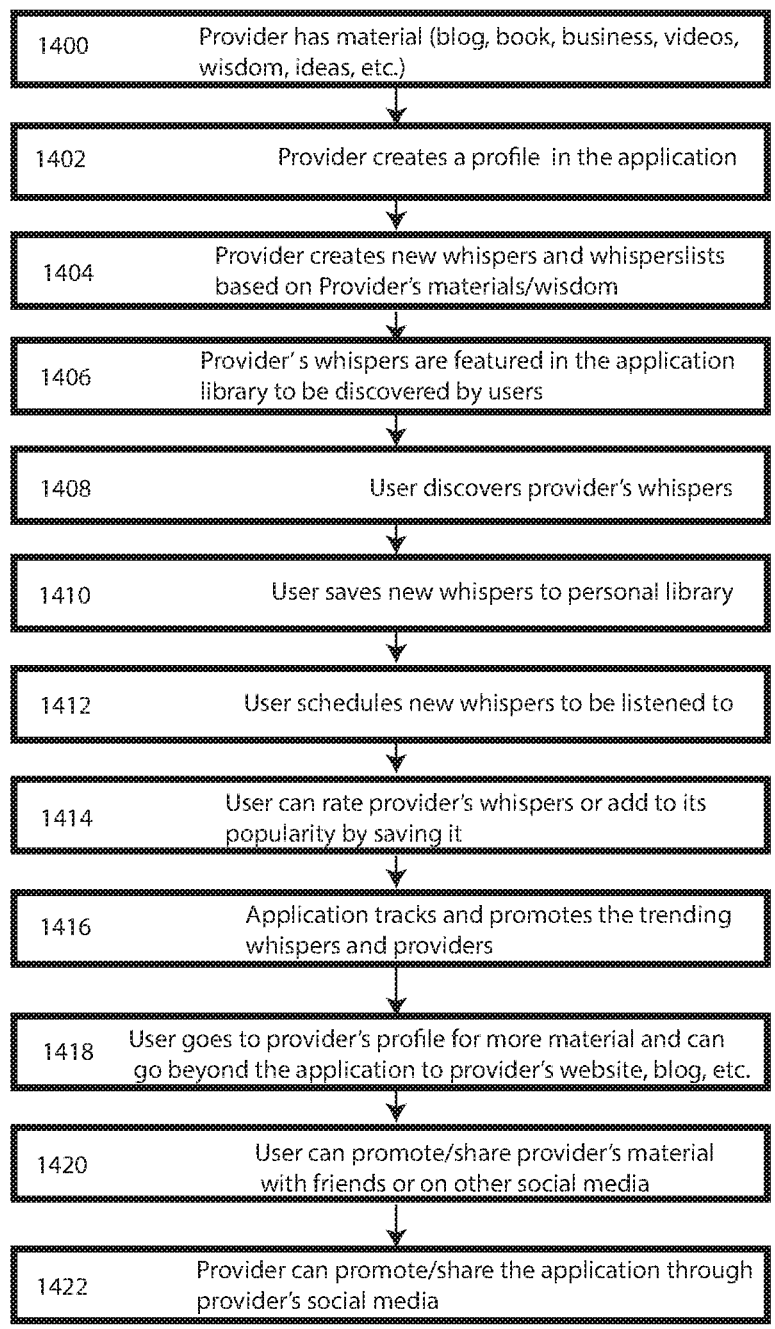
FIG. 14 relates to a non-limiting, exemplary method for providing a social media platform, using the earring and smartphone application as described herein.

FIG. 14 relates to a non-limiting, exemplary method for providing a social media platform, using the earring and smartphone application as described herein. The exemplary platform as described herein provides a complete system of social interaction and social expression, with social means of sharing inspiration and promoting those who do the inspiring. The platform enables providers to promote their own materials and for users to partake and use material throughout the day as a reminding tool or contemplation tool.

The providers may optionally be described as "whisperers", and may for example comprise authors, coaches, and positive thinkers who whisper inspiration, thereby helping others, and in turn are able to promote themselves and their own platforms.

FIG. 14 shows the exemplary stages in which a content provider might use the social media platform and how users interact. A content provider has own materials such as a blog, book, business, videos, wisdom, ideas, etc. 1400. The provider creates a profile (see for example FIG. 6*j*) in the application (stage 1402) and then optionally creates new whispers and lists thereof, or whisperslists, in stage 1404. The provider's whispers are featured in the application library (see for example FIG. 6*i*) to be discovered by users through their smartphone apps in stage 1406. A user discovers the provider's whispers through the smartphone app in stage 1408, then optionally saves the new whispers to his personal library in stage 1410. The user then schedules the whispers to be listened to throughout his day in stage 1412, again through the smartphone app. The user may optionally rate the provider or add to the whisper's popularity by saving it in stage 1414. The application can track and promote the trending whispers and providers in stage 1416. The user can go to provider's profile for more material and/or beyond the application to providers website, blog, etc. in stage 1418. The user can promote or share the provider's material with friends or on other social media in stage 1420. The provider can promote/share the application through provider's social media in stage 1422.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system comprising:
   a wearable device for outputting output audio data, comprising:
   an audio output device for outputting said output audio data, a wireless communicator for receiving audio data to form received audio data, a memory for storing said received audio data for output by said audio output device, and a mount for being wearably mounted such that said output audio data is audible to a wearer, wherein said audio output device, said memory and said wireless communicator are attached to or formed with said mount;

wherein said mount is adapted for being worn as an earring;

the wearable device further comprising a housing for housing said audio output device and said wireless communicator, wherein said housing is physically attached to or integrably formed with said mount;

and a computational device, said computational device comprising:

a wireless communicator for communicating with said wireless communicator of the wearable device, and a software for managing communicated audio data for being communicated to the wearable device for being stored on said memory of the wearable device as said received audio data, wherein said software comprises a user interface for receiving said communicated audio data and wherein said software manages transmission of said communicated audio data to the wearable device;

wherein said user interface receives a timing command from a user for controlling a schedule of audio output of said output audio data by said audio output device and said software sends at least one command to control timing to the wearable device and/or sends said communicated audio data to the wearable device according to said timing command, such that said output audio data is output according to said schedule, wherein said schedule comprises a plurality of audio data outputs in an ordered queue for playback for a time period of from an hour to twenty-four hours;

wherein said computational device as a first computational device is in communication with at least one other computational device as a second computational device for receiving audio data from said at least one other computational device to form received audio data, and for transmitting said received audio data to said wearable device as communicated audio data;

wherein each of said first and second computational devices is selected from the group consisting of a tablet, a smartphone, a mobile device, a stand-alone computer and a smart watch, and wherein said software is operated as an app by each of said first and second computational devices for controlling audio output of audio data by the wearable device, wherein a user of said app interacts with and programs the wearable device;

wherein each of said first and second computational devices operates said app and wherein said apps are in communication through a social network;

wherein said app of said first computational device receives said received audio data through said social network from said app of said second computational device;

wherein said app of said first computational device determines whether to accept said received audio data from said second computational device before said received audio data is transmitted to said wearable device as communicated audio data;

wherein said app of said first computational device determines whether to accept said received audio data from said second computational device according to a friend list on said social network;

wherein said received audio data is accepted only if sent through an app associated with a friend on said friend list.

2. The system of claim 1, wherein said audio output device comprises a speaker.

3. The system of claim 1, wherein said output audio data comprises a plurality of audio data output segments and wherein said schedule further comprises a frequency of playback of said plurality of audio data output segments.

4. The system of claim 3, wherein said schedule further comprises a determination of an exact timing of playback of said plurality of audio data output segments.

5. The system of claim 1, further comprising a content provider for providing audio data, wherein content from said content provider is selected for transmission to said computational device.

6. The system of claim 5, wherein said content comprises personalized coaching content.

7. The system of claim 1, wherein one or more personal messages are recorded at said app for transmission to the wearable device.

8. The system of claim 1, wherein said wireless communicator of said wearable device comprises an active communication channel, and a power source for powering said wireless communicator of said wearable device and said audio output device.

9. The system of claim 8, wherein said wireless communicator of said wearable device comprises a receiver comprising a communication channel selected from the group consisting of Bluetooth, infrared and cellular.

10. The system of claim 1, wherein said received audio data is only outputtable if stored in said memory.

11. The system of claim 1, further comprising a light emitter mounted on said housing for emitting light.

12. The system of claim 11, wherein said light emitter comprises an LED (light emitting diode).

13. The system of claim 1, further comprising a microcontroller for controlling output of said audio data according to one or more commands stored in said memory.

14. A method for outputting audio data to a user, using a system comprising:

a wearable device for outputting output audio data, comprising:

an audio output device for outputting said output audio data, a wireless communicator for receiving audio data to form received audio data, a memory for storing said audio data for output by said audio output device, and a mount for being wearably mounted such that said output audio data is audible to a wearer, wherein said audio output device, said memory and said wireless communicator are attached to or formed with said mount;

wherein said mount is adapted for being worn as an earring;

the wearable device further comprising a housing for housing said audio output device and said wireless communicator, wherein said housing is physically attached to or integrably formed with said mount;
and
a computational device, said computational device comprising:
a wireless communicator for communicating with said wireless communicator of the wearable device, and
a software for managing communicated audio data for being communicated to the wearable device for being stored on said memory of the wearable device as said received audio data,
wherein said software comprises a user interface for receiving said communicated audio data and wherein said software manages transmission of said communicated audio data to the wearable device;
wherein said user interface receives a timing command from a user for controlling a schedule of audio output of said output audio data by said audio output device and said software sends at least one command to control timing to the wearable device and/or sends said communicated audio data to the wearable device according to said timing command,
such that said output audio data is output according to said schedule, wherein said schedule comprises a plurality of audio data outputs in an ordered queue for playback for a time period of from an hour to twenty-four hours;
wherein the user wears the wearable device, the method comprising:
determining audio data to transmit to the wearable device through said software of said computational device as communicated audio data, by determining a schedule for a timing of outputting said audio data through said software of said computational device by determining an ordered queue of a plurality of audio data output segments, and a schedule according to which said audio data output segments are to be output for playback for a time period of from the next hour to the next twenty-four hours;
transmitting said schedule and said communicated audio data to the wearable device from said computational device, said communicated audio data comprising said plurality of audio data output segments;
and
outputting said plurality of audio data output segments through said audio output device of the wearable device according to said timing of said schedule, such that each audio data output segment is output at a specific time.

15. The method of claim 14, wherein said timing is selected from the group consisting of played at a specific time, played at a delayed time, repeated or played only once.

16. The method of claim 14, wherein said timing is played at a delayed time, and wherein said delayed time is at least 5 seconds and is no more than 60 seconds.

17. The method of claim 14, further comprising:
determining whether to accept incoming audio data from another computational device;
and if accepted, transmitting said incoming audio data to the wearable device as communicated audio data.

18. The method of claim 17, wherein said determining whether to accept incoming audio data comprises:
determining a list of at least one computational device permitted to have access;
comparing said other computational device to said list; and
accepting said incoming audio data only if said other computational device is on said list.

19. The method of claim 14, further comprising:
determining said schedule for playback of said output audio data, wherein said output audio data comprises a plurality of audio files, by the wearable device according to one or more commands entered by a user through a user interface operated by said software of said computational device; and
playing said plurality of audio files according to said schedule.

20. The method of claim 14, wherein said schedule further comprises a frequency of playback of said audio outputs.

21. The method of claim 14, wherein said software comprises an app, the method further comprising connecting said app to a social network, said social network comprising a list of friends; and
accepting audio data by said app only if sent through said social network from an app associated with a friend on said list of friends.

22. A system comprising:
a wearable device for outputting output audio data, comprising:
an audio output device for outputting said output audio data,
a wireless communicator for receiving audio data to form received audio data,
a memory for storing said received audio data for output by said audio output device,
and
a mount for being wearably mounted such that said output audio data is audible to a wearer,
wherein said audio output device, said memory and said wireless communicator are attached to or formed with said mount;
wherein said mount is adapted for being worn as an earring;
the wearable device further comprising
a housing for housing said audio output device and said wireless communicator, wherein said housing is physically attached to or integrably formed with said mount;
and
a computational device, said computational device comprising:
a wireless communicator for communicating with said wireless communicator of the wearable device, and
a software for managing communicated audio data for being communicated to the wearable device for being stored on said memory of the wearable device as said received audio data,
wherein said software comprises a user interface for receiving said communicated audio data and wherein said software manages transmission of said communicated audio data to the wearable device;
wherein said user interface receives a timing command from a user for controlling a schedule of audio output of said output audio data by said audio output device and said software sends at least one command to control timing to the wearable device and/or sends said communicated audio data to the wearable device according to said timing command,
such that said output audio data is output according to said schedule, wherein said schedule comprises a plurality of audio data outputs in an ordered queue for playback for a time period of from an hour to twenty-four hours;

wherein said output audio data comprises a plurality of audio data output segments and wherein said schedule further comprises a frequency of playback of said plurality of audio data output segments.

\* \* \* \* \*